US012069741B2

(12) United States Patent
He et al.

(10) Patent No.: US 12,069,741 B2
(45) Date of Patent: Aug. 20, 2024

(54) RANDOM ACCESS PROCEDURE BASED ON TWO-STEP RANDOM ACCESS CHANNEL PROCEDURE AND FOUR-STEP RANDOM ACCESS CHANNEL PROCEDURE

(71) Applicant: QUALCOMM Incorporated, San Diego, CA (US)

(72) Inventors: Linhai He, San Diego, CA (US); Ruiming Zheng, Beijing (CN); Jing Lei, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 330 days.

(21) Appl. No.: 17/414,938

(22) PCT Filed: Jan. 4, 2020

(86) PCT No.: PCT/CN2020/070357
§ 371 (c)(1),
(2) Date: Jun. 16, 2021

(87) PCT Pub. No.: WO2020/156036
PCT Pub. Date: Aug. 6, 2020

(65) Prior Publication Data
US 2022/0053575 A1 Feb. 17, 2022

(30) Foreign Application Priority Data
Jan. 30, 2019 (WO) ............... PCT/CN2019/074028

(51) Int. Cl.
*H04W 74/0833* (2024.01)
*H04W 56/00* (2009.01)
(Continued)

(52) U.S. Cl.
CPC ..... *H04W 74/0841* (2013.01); *H04W 56/004* (2013.01); *H04W 72/23* (2023.01); *H04W 74/0866* (2013.01)

(58) Field of Classification Search
CPC .......... H04W 74/0841; H04W 56/004; H04W 72/23; H04W 74/0866; H04W 76/11;
(Continued)

(56) References Cited

U.S. PATENT DOCUMENTS

| 11,711,851 B2 * | 7/2023 | Chen ................ H04W 74/0833 370/329 |
| 2017/0251499 A1 | 8/2017 | Radulescu et al. |

(Continued)

FOREIGN PATENT DOCUMENTS

| CN | 104684102 A | 6/2015 |
| CN | 108282899 A | 7/2018 |
| WO | 2018127226 A1 | 7/2018 |

OTHER PUBLICATIONS

International Search Report and Written Opinion—PCT/CN2019/074028—ISA/EPO—Oct. 28, 2019.
(Continued)

*Primary Examiner* — Brian T O Connor
(74) *Attorney, Agent, or Firm* — Procopio, Cory, Hargreaves & Savitch LLP

(57) ABSTRACT

Apparatus, methods, and computer-readable media for performing random access procedures based on two-step random access channel procedures and four-step random access channel procedures are disclosed herein. An example method for wireless communication at a User Equipment (UE) includes determining that a fallback timer associated with a two-step random access procedure is configured for the UE. The example method also includes generating a random access message based at least on the determining. The random access message may be one of a first-type
(Continued)

random access message associated with a four-step random access procedure and including a preamble or a second-type random access message associated with the two-step random access procedure and including the preamble and a payload. Further, the example method includes performing a random access attempt by transmitting, to a base station, the random access message.

29 Claims, 14 Drawing Sheets

(51) Int. Cl.
*H04W 72/23* (2023.01)
*H04W 74/08* (2024.01)

(58) Field of Classification Search
CPC . H04W 74/0808; H04W 24/08; H04W 76/27; H04W 80/02; H04W 74/0833; H04W 72/1268; H04W 74/002; H04L 1/1819; H04L 5/0051; H04L 5/0055; H04L 5/10; H04L 1/189; H04L 1/1893; H04L 5/0023
See application file for complete search history.

(56) References Cited

U.S. PATENT DOCUMENTS

| | | |
|---|---|---|
| 2017/0311354 A1 | 10/2017 | Lee et al. |
| 2018/0042053 A1 | 2/2018 | Martin |
| 2018/0110074 A1 | 4/2018 | Akkarakaran et al. |
| 2018/0110075 A1 | 4/2018 | Ly et al. |
| 2018/0205516 A1 | 7/2018 | Jung et al. |
| 2018/0220452 A1 | 8/2018 | Sivanesan et al. |
| 2020/0107369 A1* | 4/2020 | Jeon ................... H04W 72/23 |
| 2020/0107370 A1* | 4/2020 | Wei .................... H04W 28/06 |
| 2020/0146069 A1* | 5/2020 | Chen .................. H04W 52/362 |

OTHER PUBLICATIONS

International Search Report and Written Opinion—PCT/CN2020/070358—ISAEPO—Apr. 2, 2020.
International Search Report and Written Opinion—PCT/CN2020/070357—ISA/EPO—Mar. 26, 2020.
LG Electronics Inc: "2-Step RACH Procedure for NR-U", 3GPP Draft, 3GPP TSG-RAN WG2 #103bis, R2-1818098, 3rd Generation Partnership Project (3GPP), Mobile Competence Centre, 650, Route Des Lucioles, F-06921, Sophia-Antipolis Cedex, France, vol. RAN WG2, No. Spokane, USA, Nov. 12, 2018-Nov. 16, 2018, Nov. 12, 2018 (Nov. 12, 2018), XP051557604, pp. 1-4, Retrieved from the Internet: URL: http://www.3gpp.org/ftp/Meetings%5F3GPP%5FSYNC/RAN2/Docs/R2%2D1818098%2Ezip [retrieved on Nov. 12, 2018], Sections 1 and 2, p. 1-p. 4.
Nokia, et al., "2-step RACH Resource Assignment and Fall-back Operation for NR-U," R2-1817192, 3GPP TSG-RAN WG2 Meeting #104, Nov. 1, 2018 (Nov. 12, 2018-Nov. 16, 2018), 3 pages, sections 2-3.
Qualcomm Inc, et al., "TP for 2-step RACH in NR-U," R2-1817756, 3GPP TSG-RAN2# 104, Nov. 2, 2018 (Nov. 12, 2018-Nov. 16, 2018), 2 pages, section 2.
ZTE: "Procedures and MgsB Content [105bis#30][NR/2-step RACH]," R2-1906308, 3GPP TSG-WG2 Meeting #106, May 17, 2019 (May 17, 2019), 92 pages, page 21.

* cited by examiner

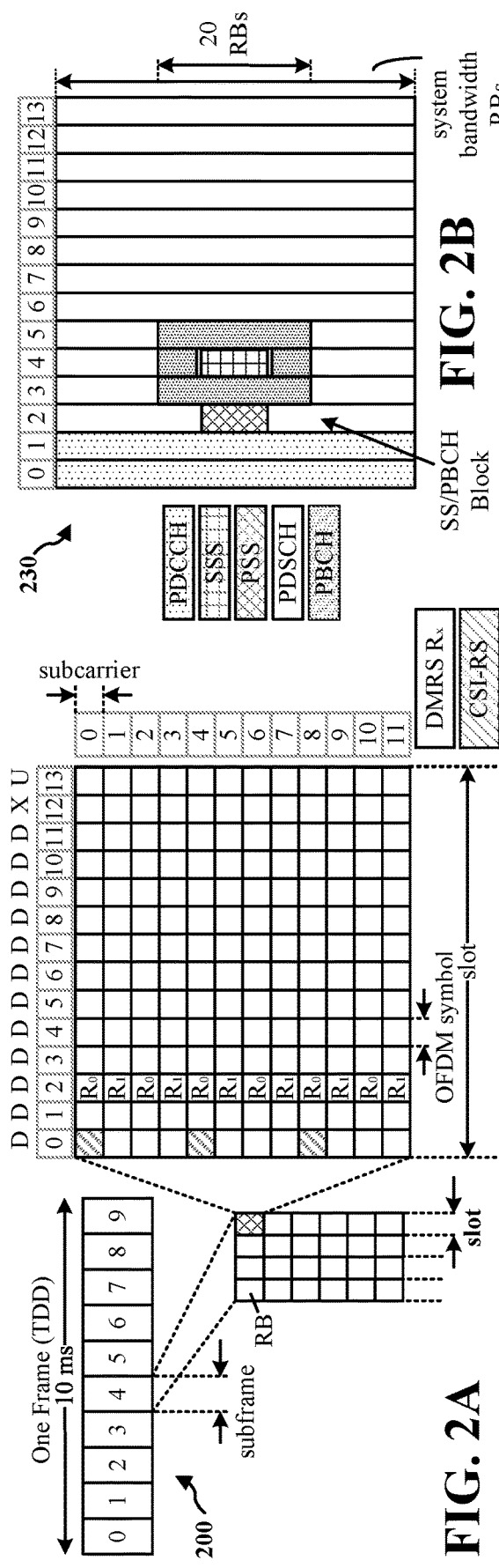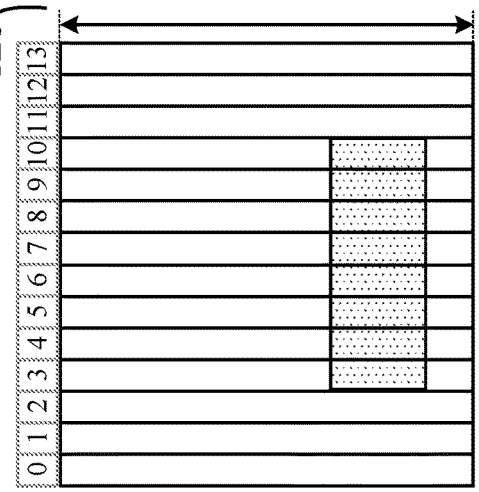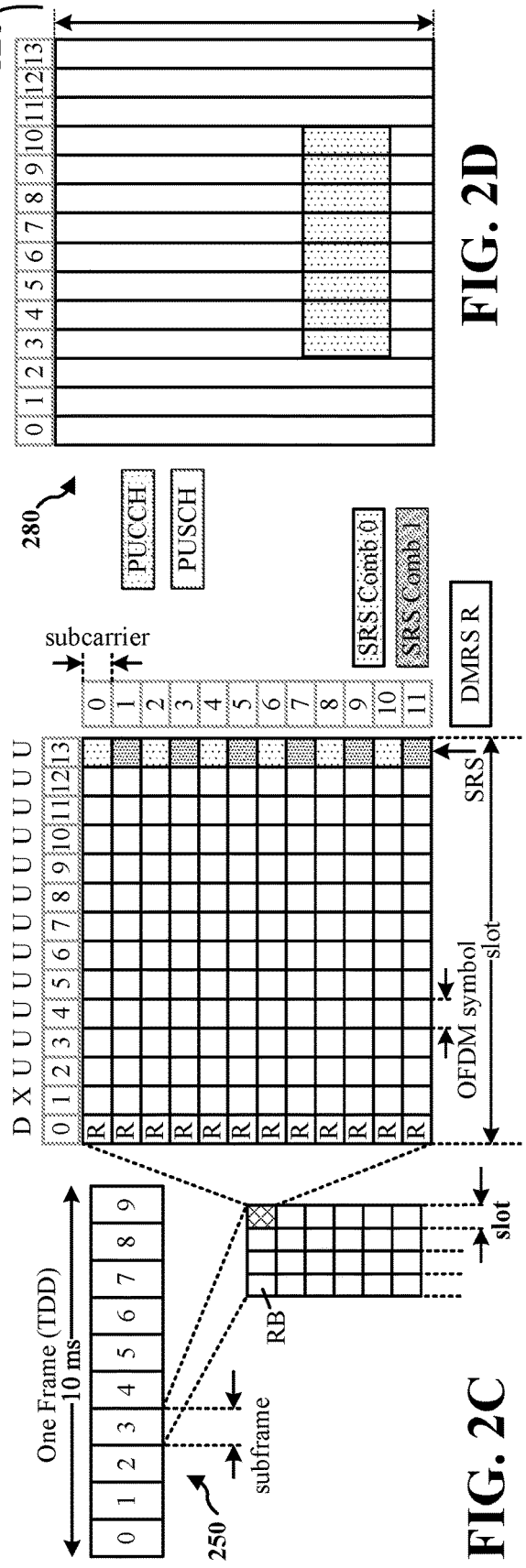

RANDOM ACCESS PROCEDURE BASED ON TWO-STEP RANDOM ACCESS CHANNEL PROCEDURE AND FOUR-STEP RANDOM ACCESS CHANNEL PROCEDURE

CROSS REFERENCE TO RELATED APPLICATION(S)

This application is a National Phase Application of International Patent Application Serial No. PCT/CN2020/070357, entitled "RANDOM ACCESS PROCEDURE BASED ON TWO-STEP RANDOM ACCESS CHANNEL PROCEDURE AND FOUR-STEP RANDOM ACCESS CHANNEL PROCEDURE," and filed on Jan. 4, 2020, which claims the benefit of and priority to International Patent Application Serial No. PCT/CN2019/074028, entitled "RANDOM ACCESS PROCEDURE BASED ON TWO-STEP RANDOM ACCESS CHANNEL PROCEDURE AND FOUR-STEP RANDOM ACCESS CHANNEL PROCEDURE," and filed on Jan. 30, 2019, which are each expressly incorporated by reference herein in their entirety.

BACKGROUND

Technical Field

The present disclosure relates generally to communication systems, and more particularly, to a wireless communication system to perform a random access channel procedure.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

A four-step random access channel (RACH) procedure is a type of random access procedure in which a user equipment (UE) sends an initial message that includes a preamble (referred to herein as "msg1"). A two-step RACH procedure is a type of random access procedure in which the UE sends an initial message that includes a preamble and a payload (referred to herein as a "msgA"). However, including the payload in the initial message associated with the two-step RACH procedure (msgA) results in a relatively larger initial message compared to the initial message associated with the four-step RACH procedure (msg1). As a result, the inclusion of the payload in the initial message associated with the two-step RACH procedure (msgA) may reduce link budget and/or cell coverage.

The present disclosure provides unique techniques for determining whether to perform a two-step RACH procedure or a four-step RACH procedure when a random access procedure is triggered. For example, the UE may perform one or more downlink measurements to measure channel quality, such as reference signal received power (RSRP) and/or a path loss measurement. Based on the one or more downlink measurements, the UE may determine whether to perform a two-step RACH procedure or to perform a four-step RACH procedure. Additional or alternative aspects include determining whether (or when) to revert to a four-step RACH procedure after initiating a two-step RACH procedure. For example, while performing a two-step RACH procedure, the UE may determine to stop performing the two-step RACH procedure and to initiate a four-step RACH procedure. In additional or alternative aspects, the UE may transition from performing the two-step RACH procedure to performing the four-step RACH procedure.

In an aspect of the disclosure, a method, a computer-readable medium, and an apparatus are provided for facilitating wireless communication at a UE. An example apparatus determines that a fallback timer associated with a two-step random access procedure is configured for the UE. The example apparatus also generates a random access message based at least on the determining. The random access message may be one of a first-type random access message associated with a four-step random access procedure and including a preamble or a second-type random access message associated with the two-step random access procedure and including the preamble and a payload. Further, the example apparatus performs a random access attempt by transmitting, to a base station, the random access message.

In another aspect of the disclosure, a method, a computer-readable medium, and an apparatus are provided for facilitating wireless communication at a UE. An example apparatus determines whether to perform a two-step random access procedure or a four-step random access procedure based at least on a fallback timer associated with the two-step random access procedure not being configured. The example apparatus also generates a random access message based on the determining. The random access message may be one of a first-type random access message associated with a four-step random access procedure and including a preamble or a second-type random access message associated with the two-step random access procedure and including the preamble and a payload. Additionally, the example apparatus performs a random access attempt by transmitting, to a base station, the random access message.

In another aspect of the disclosure, a method, a computer-readable medium, and an apparatus are provided for facilitating wireless communication at a base station. An example apparatus provides, to a User Equipment (UE), an indication that configures a fallback timer associated with a two-step random access procedure. The example apparatus also receives, from the UE, a random access message based at least in part on the indication. The random access message may be one of either a first-type random access message associated with a four-step random access procedure and including a preamble or a second-type random access message associated with the two-step random access procedure and including the preamble and a payload.

In another aspect of the disclosure, a method, a computer-readable medium, and an apparatus are provided for facilitating wireless communication at a base station. An example apparatus provides, to a UE, an indication of whether the base station supports a two-step random access procedure. The example apparatus also receives, from the UE, a random access message based at least in part on the indication. The random access message may be one of either a first-type random access message associated with a four-step random access procedure and including a preamble or a second-type random access message associated with the two-step random access procedure and including the preamble and a payload.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

DETAILED DESCRIPTION

Figure 1:
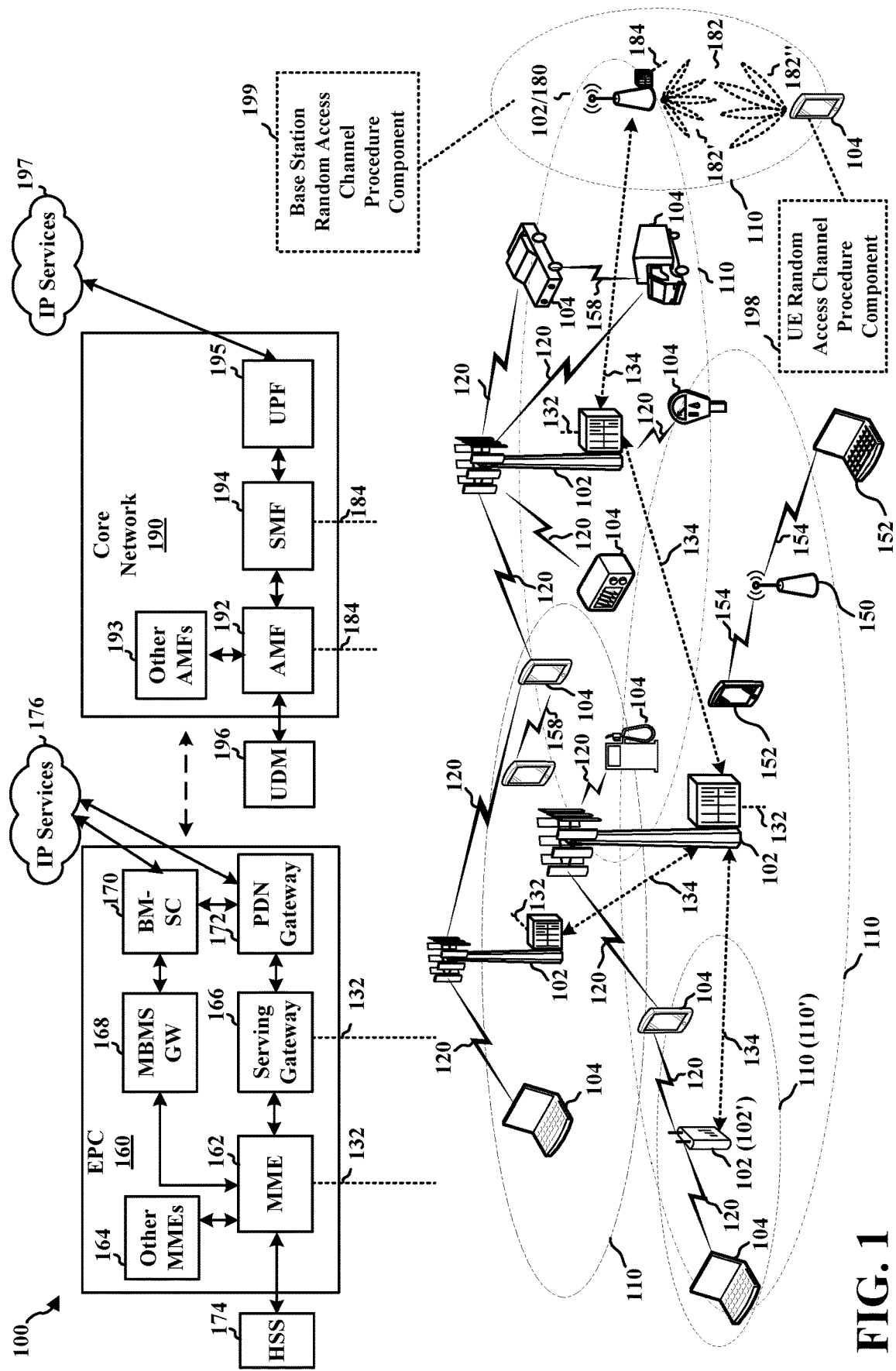
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a macrocell (e.g., a macro base station), may include and/or be referred to as an eNB, gNodeB (gNB), or another type of base station. Some base stations 180, such as a gNB, may operate in a traditional sub 6 GHz spectrum, in millimeter wave (mmW) frequencies, and/or near mmW frequencies in communication with the UE 104. When the gNB operates in mmW or near mmW frequencies, the gNB may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station, e.g., base station 180, may utilize beamforming 182 with the UE 104 to compensate for the extremely high path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ES S), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/ actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured to manage one or more aspects of wireless communication via a random access procedure. For example, the UE 104 of FIG. 1 includes a UE random access channel procedure component 198 configured to determine that a fallback timer associated with a two-step random access procedure is configured for the UE. The example UE random access channel procedure component 198 may also be configured to generate a random access message based at least on the determining. The random access message may be one of a first-type random access message associated with a four-step random access procedure and including a preamble or a second-type random access message associated with the two-step random access procedure and including the preamble and a payload. Further, the example UE random access channel procedure component 198 may be configured to perform a random access attempt by transmitting, to a base station, the random access message.

In another example, the UE random access channel procedure component 198 may be configured to determine whether to perform a two-step random access procedure or a four-step random access procedure based at least on a fallback timer associated with the two-step random access procedure not being configured. The example UE random access channel procedure component 198 may also be configured to generate a random access message based on the determining. The random access message may be one of a first-type random access message associated with a four-step random access procedure and including a preamble or a second-type random access message associated with the two-step random access procedure and including the preamble and a payload. Additionally, the example UE random access channel procedure component 198 may be configured to perform a random access attempt by transmitting, to a base station, the random access message.

Referring still to FIG. 1, in certain aspects, the base station 102/180 may be configured to manage one or more aspects of wireless communication via a random access procedure. For example, the base station 102/180 of FIG. 1 includes a base station random access channel procedure component 199 configured to provide, to a User Equipment (UE), an indication that configures a fallback timer associated with a two-step random access procedure. The example base station random access channel procedure component 199 may also be configured to receive, from the UE, a random access message based at least in part on the indication. The random access message may be one of either a first-type random access message associated with a four-step random access procedure and including a preamble or a second-type random access message associated with the two-step random access procedure and including the preamble and a payload.

In another example, the base station random access channel procedure component 199 may be configured to provide, to a UE, an indication of whether the base station supports a two-step random access procedure. The example base station random access channel procedure component 199 may also be configured to receive, from the UE, a random access message based at least in part on the indication. The random access message may be one of either a first-type random access message associated with a four-step random access procedure and including a preamble or a second-type random access message associated with the two-step random access procedure and including the preamble and a payload.

Although the following description may be focused on 5GNR, the concepts described herein may be applicable to other similar areas, such as LTE, LTE-A, CDMA, GSM, and other wireless technologies.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu * 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
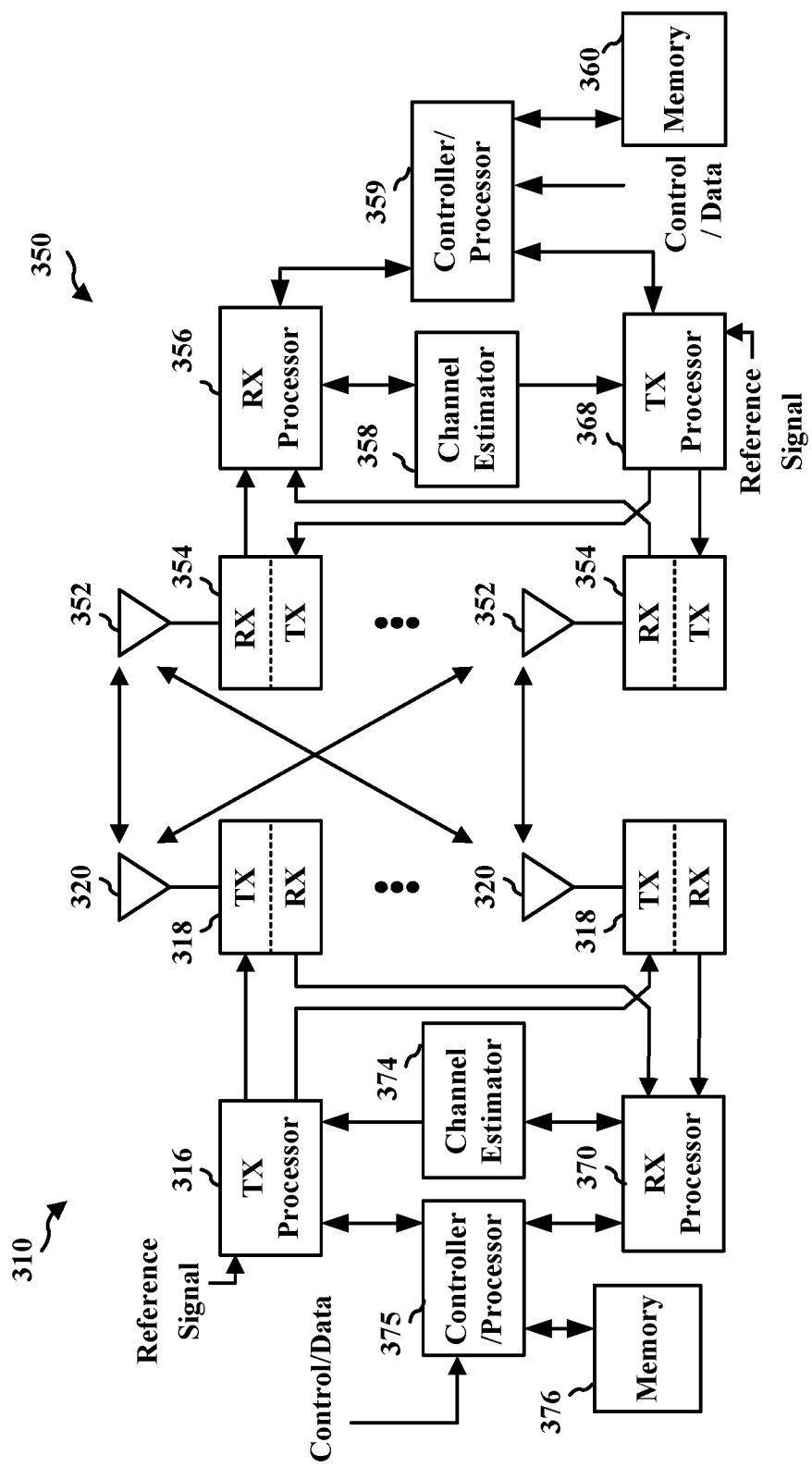
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the UE random access channel procedure component 198 of FIG. 1.

At least one of the TX processor 316, the RX processor 370, and the controller/processor 375 may be configured to perform aspects in connection with the base station random access channel procedure component 199 of FIG. 1.

A wireless communication system may include a base station and a UE. The base station may provide a cell on which the UE may operate. In order to communicate in the wireless communication system, the base station and the UE may acquire a timing advance for uplink signals. The base station and the UE may acquire timing synchronization (e.g., uplink timing synchronization) through a random access procedure. For example, the UE may initiate the random access procedure for initial access to the cell provided by the base station, RRC connection reestablishment, handover from another base station to the base station, reacquisition of timing synchronization, transition from an RRC Inactive state, SCell timing alignment, request for Other System Information (SI), and/or beam failure recovery.

In certain aspects, the random access procedure may be a four-step random access channel (RACH) procedure in which the UE and the base station exchange four messages. In certain aspects, the random access procedure may be a two-step RACH procedure in which the UE and the base station exchange two messages.

Figure 4:
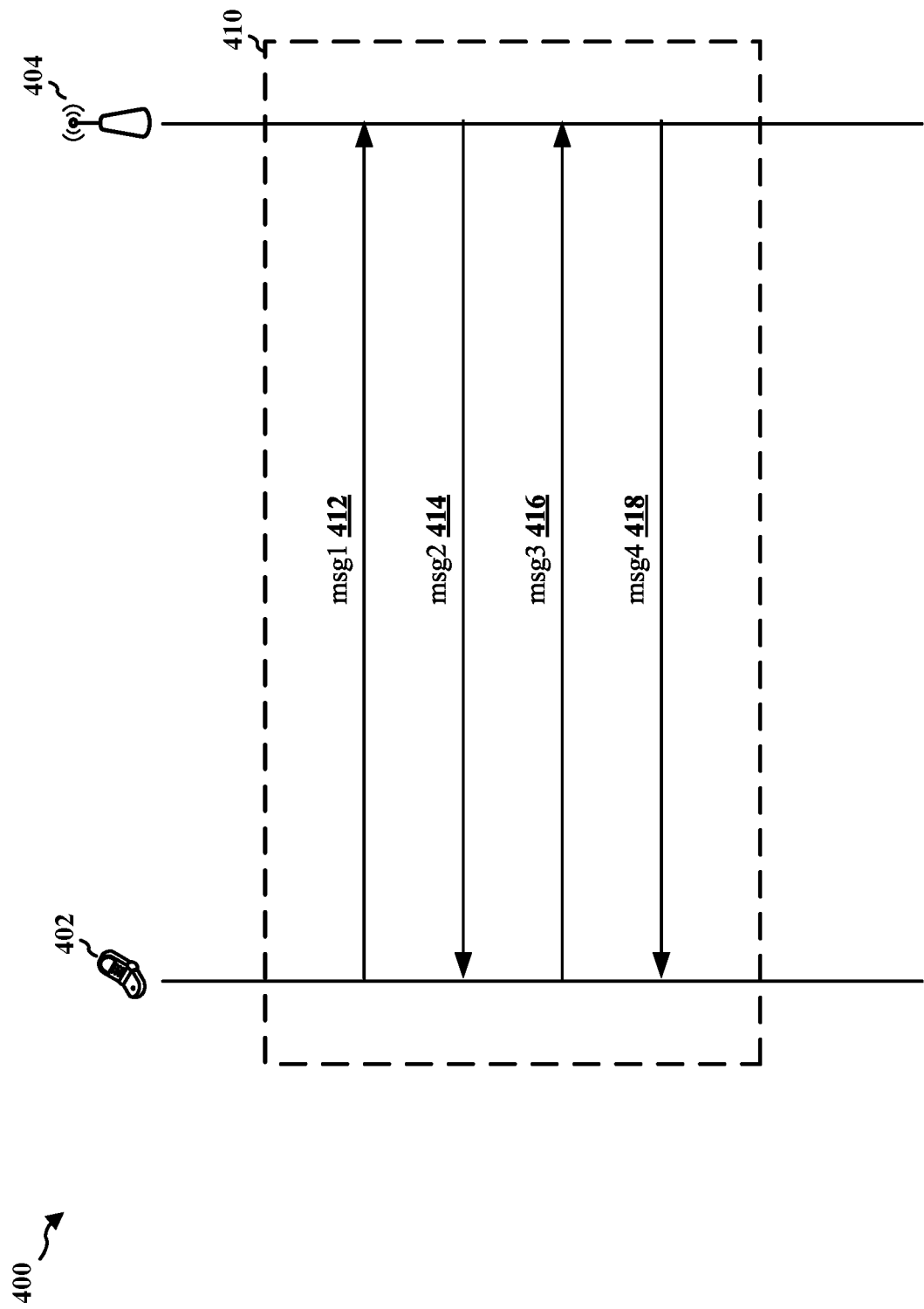
FIG. 4 is a diagram illustrating a call flow diagram between a UE and a base station implementing a four-step random access channel (RACH) procedure.

FIG. 4 is a diagram illustrating a call flow diagram 400 between a UE 402 and a base station 404 implementing a four-step RACH procedure 410. Aspects of the UE 402 may be described with respect to the UE 104 of FIG. 1 and/or the UE 350 of FIG. 3. Aspects of the base station 404 may be described with respect to the base station 102 of FIG. 1, the base station 180 of FIG. 1, and/or the base station 310 of FIG. 3.

In the illustrated example of FIG. 4, the four-step RACH procedure 410 includes the exchange of four messages. Specifically, the UE 402 may initiate the message exchange of the four-step RACH procedure 410 by sending, to the base station 404, a first four-step RACH message 412 including a preamble (e.g., without a payload). The base station 404 then sends, to the UE 402, a second four-step RACH message 414 including a random access response (RAR). In certain aspects, the second four-step RACH message 414 may include an identifier of the RACH preamble, a timing advance (TA), an uplink grant for the UE 402 to transmit data, cell radio network temporary identifier (C-RNTI), and/or a back-off indicator. The UE 402 then sends a third four-step RACH message 416 to the base station 404. In certain aspects, the third four-step RACH message 416 may include a radio resource control (RRC) connection request, an RRC connection re-establishment request, or an RRC connection resume request, depending on the trigger for the UE 402 initiating the random access procedure. The base station 404 then completes the four-step RACH procedure 410 by sending a fourth four-step RACH message 418 to the UE 402. In certain aspects, the fourth four-step RACH message 418 includes timing advancement information, contention resolution information, and/or RRC connection setup information. As shown in FIG. 4, the first four-step RACH message 412 may be referred to as "msg1," the second four-step RACH message 414 may be referred to as "msg2," the third four-step RACH message 416 may be referred to as "msg3," and the fourth four-step RACH message 418 may be referred to as "msg4."

Although not shown, in some examples, the UE 402 may re-transmit a RACH message. For example, in certain aspects, after transmitting the msg1 412, the UE 402 may re-transmit (e.g., periodically, a-periodically, and/or as a one-time event) the msg1 412 until the msg2 414 is received from the base station 404 and/or a timer expires. In other examples, the RACH message received by the UE 402 (e.g., the msg2 414 and/or the msg4 418) may indicate that the base station 404 was unable to process (e.g., decode) at least a portion of a RACH message transmitted by the UE 402. In some such examples, the UE 402 may then re-transmit the corresponding RACH message.

Figure 5:
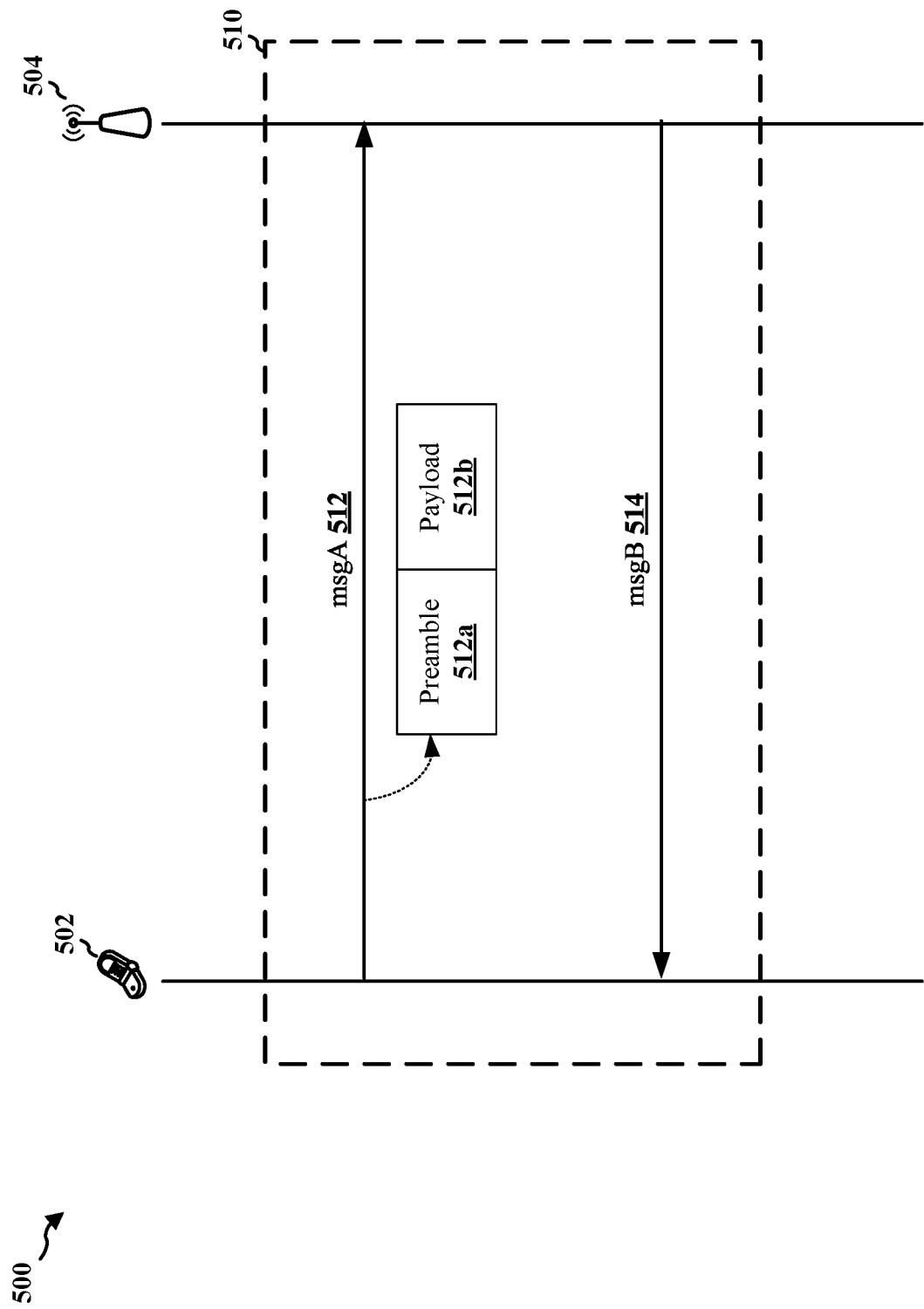
FIG. 5 is a diagram illustrating a call flow diagram between a UE and a base station implementing a two-step RACH procedure.

FIG. 5 is a diagram illustrating a call flow diagram 500 between a UE 502 and a base station 504 implementing a two-step RACH procedure 510. Aspects of the UE 502 may be described with respect to the UE 104 of FIG. 1, the UE 350 of FIG. 3, and/or the UE 402 of FIG. 4. Aspects of the base station 504 may be described with respect to the base station 102 of FIG. 1, the base station 180 of FIG. 1, the base station 310 of FIG. 3, and/or the base station 404 of FIG. 4.

In the illustrated example of FIG. 5, the two-step RACH procedure 510 includes the exchange of two messages. Specifically, the UE 502 may initiate the message exchange of the two-step RACH procedure 510 by sending a first two-step RACH message 512 to the base station 504 and, responsive to the first two-step RACH message 512, the base station 504 may complete the message exchange of the two-step RACH procedure 510 by sending a second two-step RACH message 514 to the UE 502. In certain aspects, the first two-step RACH message 512 may be referred to as "msgA" and the second two-step RACH message 514 may be referred to as "msgB."

In certain aspects, to initiate the two-step RACH procedure 510, the UE 502 may generate the msgA 512. For the two-step RACH procedure 510, the UE 502 may generate the msgA 512 to include at least a preamble 512a (e.g., a PRACH preamble) and a payload 512b. In certain aspects, the preamble 512a may correspond to the msg1 412 and the payload 512b may correspond to the msg3 416 of the four-step RACH procedure 410 of FIG. 4.

The UE 502 may be identified by the base station 504 according to an identifier (ID) of the UE 502, such as a radio network temporary identifier (RNTI) (e.g., a random access (RA) RNTI, a temporary RNTI, etc.). The msgA 512 may be the first transmission by the UE 502 to the base station 504 and, therefore, the base station 504 may benefit from a mechanism for indicating the ID of the UE 502 to the base station 504 in the msgA 512, particularly because the msgA 512 may include data from the UE 502 in the payload 512b. Accordingly, the UE 502 may indicate an ID of the UE 502 using one or more (or a combination of) approaches for including information in the msgA 512.

In response to receiving the msgA 512, the base station 504 may generate the msgB 514. The base station 504 may generate the msgB 514 to include control information in a PDCCH and data in a PDSCH. The base station 504 may send the msgB 514 to the UE 502 to complete the two-step RACH procedure 510. In certain aspects, information included in the msgB 514 may correspond to the msg2 414 and the msg4 418 of the four-step RACH procedure 410 of FIG. 4. The UE 502 may receive the msgB 514, and the UE 502 may acquire timing synchronization based on the msgB 514.

Although not shown, in certain aspects, the UE 502 may re-transmit a RACH message. For example, in certain aspects, after transmitting the msgA 512, the UE 502 may re-transmit (e.g., periodically, a-periodically, and/or as a one-time event) the msgA 512 until the msgB 514 is received from the base station 504 and/or a timer expires. In some examples, the RACH response message received by the UE 502 (e.g., the msgB 514) may indicate that the base station 504 was unable to process (e.g., decode) at least a portion of the RACH message. In some such examples, the UE 502 may then re-transmit the corresponding RACH message. For example, the base station 504 may transmit a RACH message indicating that the base station 504 was unable to decode the payload 512b of the msgA 512 and the UE 502 may retransmit the msgA 512.

While the two-step RACH procedure 510 of FIG. 5 differs in some aspects from the four-step RACH procedure 410 of FIG. 4, some aspects may be common across the RACH procedures 410, 510. For example, sequences associated with a physical RACH (PRACH) and sequences associated with DMRS used for the four-step RACH procedure 410 may also be used for the two-step RACH procedure 510. Further, a TX chain used for a PUSCH in the four-step RACH procedure 410 may also be used for the two-step RACH procedure 510.

While performing a two-step RACH procedure includes exchanging fewer messages than when performing a four-step RACH procedure, the increased size of the first two-step RACH message (e.g., the msgA 512 of FIG. 5) compared to the size of the first four-step RACH message (e.g., the msg1 412 of FIG. 4) may reduce link budget and, thus, may adversely impact cell coverage. Thus, techniques disclosed herein enable the UE to determine whether to perform a two-step RACH procedure or a four-step RACH procedure. In certain aspects, the UE may additionally or alternatively determine when to terminate performing the two-step RACH procedure and to initiate performing the four-step RACH procedure. In certain aspects, the UE may additionally or alternatively determine when to transition from performing the two-step RACH procedure to the four-step RACH procedure.

Figure 6:
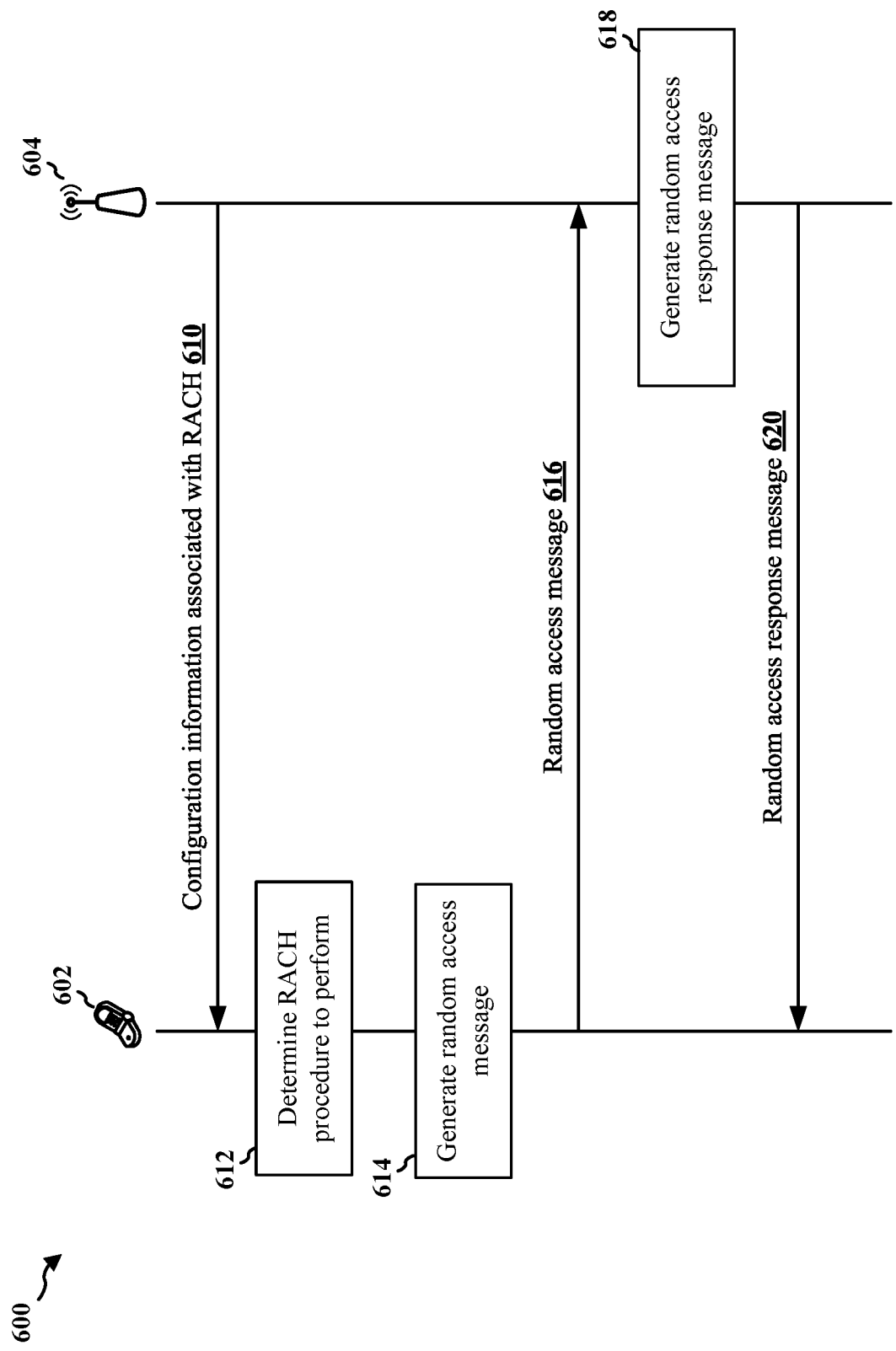
FIG. 6 is a diagram illustrating a call flow diagram between a UE and a base station when the UE employs techniques for determining whether to perform a two-step RACH procedure or a four-step RACH procedure, as disclosed herein.

FIG. 6 is a diagram illustrating a call flow diagram 600 between a UE 602 and a base station 604 when the UE 602 employs techniques for determining whether to perform a two-step RACH procedure or a four-step RACH procedure, as disclosed herein. Aspects of the UE 602 may be described with respect to the UE 104 of FIG. 1, the UE 350 of FIG. 3, the UE 402 of FIG. 4, and/or the UE 502 of FIG. 5. Aspects of the base station 604 may be described with respect to the base station 102 of FIG. 1, the base station 180 of FIG. 1, the base station 310 of FIG. 3, the base station 404 of FIG. 4, and/or the base station 504 of FIG. 5.

The base station 604 may periodically send (e.g., broadcast) information associated with operating on the cell provided by the base station 604. As described with respect to FIG. 2B, supra, the base station 604 may send a MIB and one or more SIBs. In the illustrated example of FIG. 6, the base station 604 transmits configuration information 610 associated with performing a RACH procedure. In certain aspects, the base station 604 may transmit the configuration information 610 via system information while the UE 602 is operating in a connected mode, operating in an idle mode, or operating in an inactive mode. In certain aspects, the base station 604 may transmit the configuration information 610 via dedicated signaling while the UE 602 is operating in a connected mode.

In some aspects, the configuration information 610 may indicate whether the base station 604 supports performing a two-step RACH procedure. In some aspects, the configuration information 610 may indicate that the base station 604 supports the two-step RACH procedure for one or more UE access classes. In some aspects, the configuration information 610 may include one or more parameter(s) associated with performing the two-step RACH procedure. For example, the configuration information 610 may include one or more of a payload size, a Reference Signal Received Power (RSRP) threshold, a path loss threshold, a fallback timer setting, a first-type random access message transmittal count threshold, and/or a second-type random access message transmittal count threshold.

In certain aspects, the payload size parameter may be associated with, for example, the payload 512b of FIG. 5. In certain aspects, the payload size parameter may include a set of payload sizes. In certain such examples, each payload size included in the set of payload sizes may correspond to a set of one or more preambles. In certain examples, the set of one or more preambles may be disjointed preambles. In certain aspects, the Reference Signal Received Power (RSRP) threshold may be associated with a minimum RSRP measurement at which the UE 602 may perform the two-step RACH procedure. In certain aspects, the path loss threshold may be associated with a maximum path loss measurement at which the UE 602 may perform the two-step RACH procedure. In certain aspects, the fallback timer setting may indicate whether the UE 602 is configured to enable a fallback timer while performing a two-step RACH procedure. In certain aspects, the first-type random access message transmittal count threshold is associated with a maximum quantity of first-type random access message transmittals that the UE 602 may perform. As disclosed herein, a first-type random access message is a random access message that includes a preamble (e.g., the msg1 412 of the four-step RACH procedure 410 of FIG. 4) without a payload. Thus, the first-type random access message transmittal count threshold indicates a maximum quantity of transmissions and/or re-transmissions of the msg1 412 that the UE 602 may perform. In some examples, the second-type random access message transmittal count threshold is associated with a maximum quantity of second-type random access message transmittals that the UE 602 may perform. As disclosed herein, a second-type random access message may be a random access message that includes a preamble and a payload (e.g., the msgA 512 of the two-step RACH procedure 510 of FIG. 5). Thus, the second-type random access message transmittal count threshold indicates a maximum quantity of transmissions and/or re-transmissions of the msgA 512 that the UE 602 may perform.

The UE 602 may receive and decode the configuration information 610 and may subsequently perform a RACH attempt based at least in part on the configuration information 610. For example, at 612, the UE 602 determines whether to perform a two-step RACH procedure (e.g., the two-step RACH procedure 510 of FIG. 5) or a four-step RACH procedure (e.g., the four-step RACH procedure 410 of FIG. 4) based at least in part on the configuration information 610, including the one or more parameters. For example, if the configuration information 610 indicates that the base station 604 does not support the two-step RACH procedure, then the UE 602 determines, at 612, to perform the four-step RACH procedure. In certain aspects, the configuration information 610 may indicate that the base station 604 supports the two-step RACH procedure for one or more UE access classes. In certain such examples, if an access class associated with the UE 602 is not indicated as supported by the configuration information 610, the UE 602 determines, at 612, to perform the four-step RACH procedure.

However, if the configuration information 610 indicates that the base station 604 supports the two-step RACH procedure (and/or if the access class associated with the UE is indicated as being supported by the base station 604 for performing the two-step RACH procedure), then the UE 602 may perform a second check to determine whether an estimated link quality between the UE 602 and the base station 604 is satisfactory to perform the two-step RACH procedure. As described above, due to the larger size of the msgA compared to the size of the msg1 (e.g., when the msgA includes a preamble and a payload compared to the msg1 that includes a preamble without a payload), an increased link budget is needed to perform the two-step RACH procedure compared to performing the four-step RACH procedure. To that end, in certain aspects, after determining that the base station 604 supports the two-step RACH procedure (and/or the base station 604 supports the two-step RACH procedure for the access class associated with the UE 602), the UE 602 may perform one or more downlink measurements to measure channel quality, such as reference signal received power (RSRP) and/or a path loss measurement. For example, the UE 602 may measure a reference signal and compare the reference signal measurement to an associated parameter and/or threshold provided in the configuration information 610. In certain aspects, the reference signal may be comprised in a Synchronization Signal Block (SSB). In certain aspects, the reference signal may comprise a channel state information reference signal (CSI-RS). In some examples, the UE 602 may select the reference signal based on a predetermined rule. For example, the UE 602 may select the reference signal for which an RSRP measurement is available. In some examples, the UE 602 may select the reference signal from among a plurality of reference signals received by the UE 602 and based on respective reference signal measurements. For example, the UE 602 may select the reference signal associated with the highest RSRP measurement, the lowest path loss measurement, etc.

In some examples, after selecting the reference signal and measuring the selected reference signal, the UE 602 may compare the reference signal measurement to a threshold associated with the reference signal measurement. In some examples, the threshold associated with the reference signal measurement may be provided by the base station 604 via the configuration information 610 (e.g., one or more parameter(s)). Based on the comparison (e.g., whether the reference signal measurement satisfies the associated threshold), the UE 602 may determine whether to perform the two-step RACH procedure or the four-step RACH procedure.

For example, if the reference signal measurement is an RSRP measurement, the UE 602 may compare the RSRP measurement of the reference signal to the RSRP threshold provided in the configuration information 610. In some such examples, if the UE 602 determines that the RSRP measurement of the reference signal satisfies the RSRP threshold (e.g., the RSRP measurement of the reference signal is greater than or equal to the RSRP threshold), the UE 602 may determine, at 612, to perform the two-step RACH procedure. Otherwise, if the UE 602 determines that the RSRP measurement of the reference signal does not satisfy the RSRP threshold (e.g., the RSRP measurement of the reference signal is less than the RSRP threshold), the UE 602 may determine, at 612, to perform the four-step RACH procedure.

In some examples, the reference signal measurement is a path loss measurement and the UE 602 may compare the path loss measurement of the reference signal to the path loss threshold provided in the configuration information 610. In some such examples, if the UE 602 determines that the path loss measurement of the reference signal satisfies the path loss threshold (e.g., the path loss measurement of the reference signal is less than or equal to the path loss threshold), the UE 602 may determine, at 612, to perform the two-step RACH procedure. Otherwise, if the UE 602 determines that the path loss measurement of the reference signal does not satisfy the path loss threshold (e.g., the path loss measurement of the reference signal is greater than the path loss threshold), the UE 602 may determine, at 612, to perform the four-step RACH procedure.

At 614, the UE 602 generates a random access message 616 based on the determined RACH procedure (e.g., at 612). For example, after determining to perform the four-step RACH procedure, the UE 602 may generate a first random access message including a preamble without a payload (e.g., the msg1 412). Otherwise, if the UE 602 determines to perform the two-step RACH procedure, the UE 602 may generate a second random access message including a preamble and a payload (e.g., the msgA 512 including the preamble 512*a* and the payload 512*b*). The UE 602 then attempts to perform the determined RACH procedure by transmitting the generated random access message 616 to the base station 604.

In some examples, after transmitting the generated random access message 616 to the base station 604, the UE 602 increments a transmittal count associated with the random access message 616. For example, if the random access message 616 is the msg1 412 including a preamble without a payload, the UE 602 increments a first-type random access message transmittal count that corresponds to the quantity of transmissions and/or re-transmissions of the first-type random access message (e.g., the msg1 412). Otherwise, if the random access message 616 is the msgA 512 including the preamble 512*a* and the payload 512*b*, the UE 602 increments a second-type random access message transmittal count that corresponds to the quantity of transmissions and/or re-transmissions of the second-type random access message (e.g., the msgA 512).

At 618, the base station 604 generates a random access response message 620 based at least in part on the random access message 616 received from the UE 602. For example, if the random access message 616 is the msg1 412 including the preamble without a payload, the base station 604 may determine that the UE 602 is performing the four-step RACH procedure and may generate the msg2 414 (e.g., of the four-step RACH procedure 410 of FIG. 4) including, for example, an identifier of the RACH preamble, a time advance (TA), an uplink grant for the UE 602 to transmit data, cell radio network temporary identifier (C-RNTI), and/or a back-off indicator. Otherwise, if the random access message 616 is the msgA 512 including the preamble 512*a* and the payload 512*b*, the base station 604 may determine that the UE 602 is performing the two-step RACH procedure and may generate the msgB 514 (e.g., of the two-step RACH procedure 510 of FIG. 5) including, for example, an uplink grant for the UE 602 to transmit data, control information in a PDCCH, and/or data in a PDSCH. The base station 604 may then transmit the random access response message 620 (e.g., the msg2 414 or the msgB 514) to the UE 602.

In some examples, the UE 602 may use RNTI to receive a response message associated with the two-step RACH procedure (e.g., the msgB 514) or to receive a response message associated with the four-step RACH procedure (e.g., the msg2 414). In some examples, the UE may use, while operating in an idle mode or an inactive mode, a random access RNTI (RA-RNTI) to receive a response message associated with the two-step RACH procedure (e.g., the msgB 514) or to receive a response message associated with the four-step RACH procedure (e.g., the msg2 414). In some examples, the UE 602 may use a cell RNTI (C-RNTI) to receive a response message associated with a two-step RACH procedure while the UE is operating in a connected mode.

In some examples, the UE 602 may detect a re-transmission triggering event. In some examples, a re-transmission triggering event may include not receiving a response message from the base station in response to the random access message (e.g., no msg2 414 or msgB 514 is received by the UE 602). In some examples, a re-transmission triggering event may include receiving a response message including information indicating a failure by the base station 604 to process (e.g., decode) at least a portion of the random access message received by the base station 604 (e.g., the payload 512b of the msgA 512).

In some examples, in response to detecting a re-transmission triggering event, the UE 602 may re-transmit the random access message. In some examples, in response to detecting a re-transmission triggering event, the UE 602 may determine to stop the current RACH procedure and initiate a new RACH procedure. In some examples, in response to detecting a re-transmission triggering event, the UE 602 may determine to transition from the current RACH procedure to another RACH procedure. In some examples, in response to detecting a re-transmission triggering event, the UE 602 may stop performing all RACH procedures (until the UE 602 is able to next perform the one or more downlink measurements).

In some examples, after detecting a re-transmission triggering event, the UE 602 may determine how to proceed based on the current RACH procedure being performed and/or based on one or more parameters included in the configuration information 610. For example, in some examples, the one or more parameters may include the fallback timer setting indicative of whether a fallback timer is configured for the UE 602 and/or on a random access message transmittal count threshold.

In some examples, the fallback timer setting may indicate that a fallback timer is not configured for the UE 602. In some such examples, the UE 602 may determine that the UE 602 has not received a response message (e.g., the random access response message 620). The UE 602 may then determine how to proceed based on a transmittal count associated with the random access message. For example, when performing the two-step RACH procedure, the UE 602 may compare the msgA transmittal count (e.g., the second-type random access message transmittal count) to the msgA transmittal count threshold (e.g., the second-type random access message transmittal count threshold provided via the configuration information 610).

Otherwise, if the UE 602 is performing the four-step RACH procedure, the UE 602 may compare the msg1 transmittal count (e.g., the first-type random access message transmittal count) to the msg1 transmittal count threshold (e.g., the first-type random access message transmittal count threshold provided via the configuration information 610). In some examples, if the UE 602 determines that the random access message transmittal count does not satisfy the respective random access message transmittal count threshold (e.g., the msgA transmittal count is greater than the msgA transmittal count threshold or the msg1 transmittal count is greater than the msg1 transmittal count threshold), the UE 602 stops performing RACH procedures and notifies the upper layer (e.g., the PHY layer). Otherwise, if the UE 602 determines that the random access message transmittal count satisfies the respective random access message transmittal count threshold (e.g., the msgA transmittal count is less than or equal to the msgA transmittal count threshold or the msg1 transmittal count is less than or equal to the msg1 transmittal count threshold), the UE 602 may return to 612 to determine whether to perform the two-step RACH procedure or the four-step RACH procedure (e.g., based on whether a reference signal measurement satisfies a threshold associated with the reference signal measurement).

In some examples, if the fallback timer setting indicates that the fallback timer is configured and active for the UE 602, the UE 602 may default to attempting to perform the two-step RACH procedure. For example, while the fallback timer is active, the UE 602 may repeat transmissions of the msgA for reference signals with reference signal measurements that satisfy the associated threshold until the UE 602 receives a msgB (e.g., the two-step RACH procedure was successfully completed), the fallback timer expires, or the msgA transmittal count does not satisfy the msgA transmittal count threshold (e.g., the second-type random access message transmittal count is greater than the second-type random access message transmittal count threshold). In some examples, if the UE 602 determines that the fallback timer expired or the msgA transmittal count does not satisfy the msgA transmittal count threshold, the UE 602 may stop performing the two-step RACH procedure and initiate performing the four-step RACH procedure (e.g., the UE may transmit the msg1 412 of the four-step RACH procedure 410 including the preamble without a payload).

The fallback timer may be implemented by any suitable technique for providing an upper-bound limiting when the two-step RACH attempts that the UE 602 may perform. In some examples, the fallback timer may be a timer that provides a duration during which the UE 602 may initiate performing the two-step RACH procedure. In some such examples, if the UE 602 determines that the fallback timer is active, the UE 602 may continue performing two-step RACH attempts. However, if the UE 602 determines that the fallback timer is not active, then the UE 602 may stop performing two-step RACH attempts and may start performing four-step RACH attempts.

In some examples, the fallback timer may be a counter that provides a maximum quantity of two-step RACH attempts that the UE 602 may perform. For example, the UE 602 may increment a count each time the UE 602 performs a two-step RACH attempt. In some such examples, if the UE 602 determines that the counter is active (e.g., the quantity of two-step RACH attempts performed by the UE 602 is less than the maximum quantity of two-step RACH attempts), then the UE may perform another two-step RACH attempt. However, if the UE 602 determines that the counter is not active (e.g., the quantity of two-step RACH attempts performed by the UE 602 is equal to the maximum quantity of two-step RACH attempts), then the UE may stop performing two-step RACH attempts and may start performing four-step RACH attempts.

Parameters associated with the fallback timer may be included in the configuration information 610. For example, if the fallback timer is a timer, then the configuration information 610 may indicate a duration during which the UE 602 may perform two-step RACH attempts. In other examples in which the fallback timer is a counter, then the configuration information 610 may indicate the maximum quantity of two-step RACH attempts that the UE 602 may perform. In some examples, the parameters associated with the fallback timer may be a network-wide parameter provided via a SIB. In some examples, the parameters associated with the fallback timer may be provided via dedicated signaling. In some examples, the parameters associated with the fallback timer may indicate whether the respective fallback timer (e.g., the timer or the counter) is active or not active.

In some examples, the UE 602 may transition from performing the two-step RACH procedure to the four-step RACH procedure based on, for example, the response message received from the base station 604. For example, the base station 604 may receive the msgA 512 including the preamble 512a and the payload 512b from the UE 602. While processing the msgA 512, the base station 604 may successfully decode the preamble 512a of the msgA 512 but fail to decode the payload 512b of the msgA 512. In some examples, the payload 512b may include an identifier associated with the UE 604. The base station 604 may then send a response message that is the same as the second four-step RACH response message 414 (e.g., the msg2). In some examples, the msg2 414 may include an uplink grant for the UE 602. In some such examples, in response to receiving the msg2 414 from the base station 604, the UE 602 may transmit the third four-step RACH message 416 (e.g., the msg3) to the base station 604 using the uplink grant and may wait for the fourth four-step RACH response message 418 (e.g., the msg4) from the base station 604. In some such examples, the RACH attempt is successful if the UE 602 is able to decode the msg4 418 and the msg4 418 includes the UE identifier of the UE 602. However, if the UE 602 is unable to decode the msg4 418 and/or the msg4 418 does not include the UE identifier of the UE 602, the RACH attempt may be considered as unsuccessful. In some such examples, the UE 602 may then return to 612 to determine whether to perform a two-step RACH procedure or a four-step RACH procedure.

Figure 7:
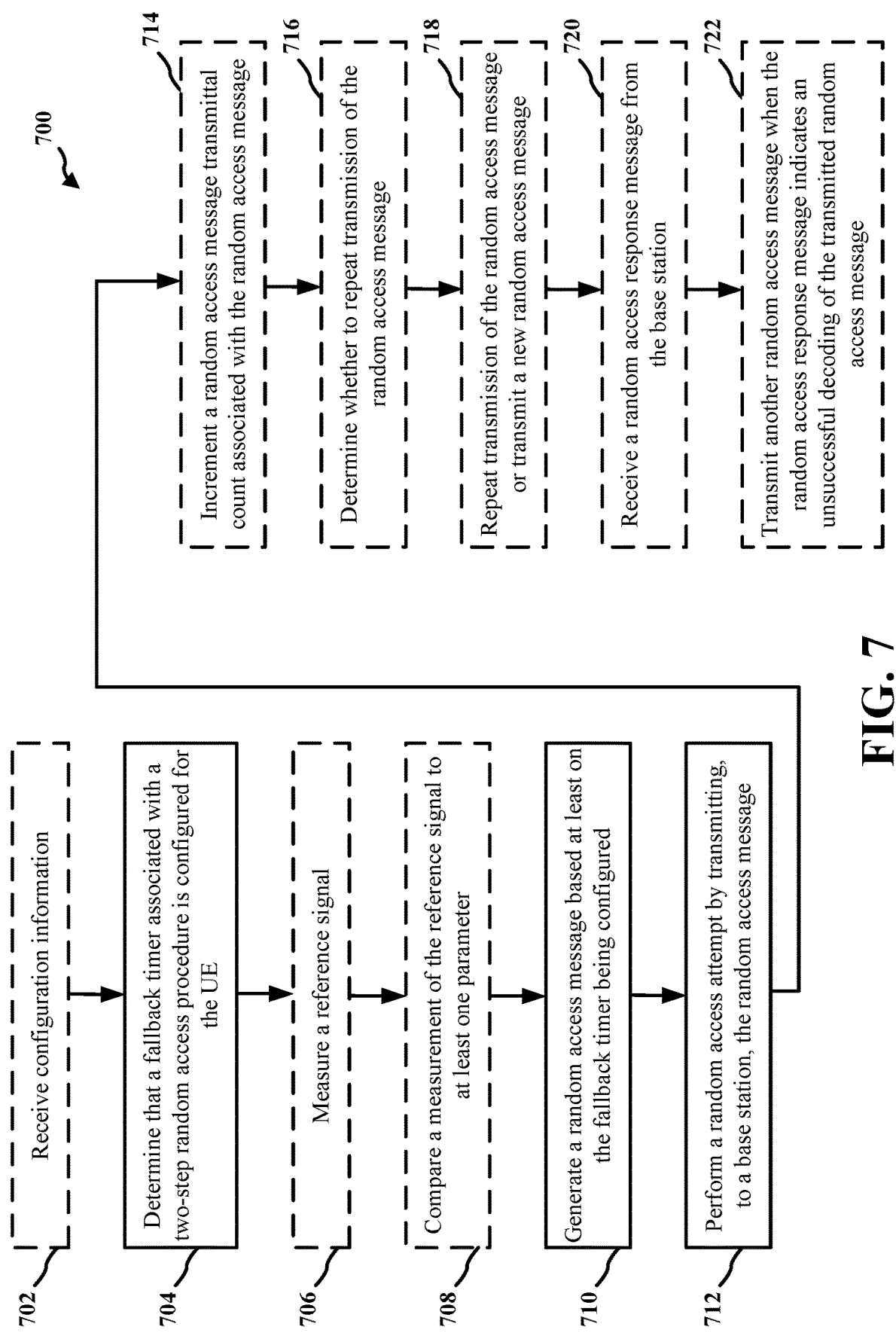
FIG. 7 is a flowchart of a method of wireless communication for a UE to perform a random access procedure.

FIG. 7 is a flowchart 700 of a method of wireless communication. The method may be performed by a UE (e.g., the UE 104 of FIG. 1, the UE 350 of FIG. 3, the UE 402 of FIG. 4, the UE 502 of FIG. 5, the UE 602 of FIG. 6, the UE 1350 of FIG. 13, the apparatus 902/902' of FIGS. 9 and 10, respectively, and/or the processing system 1014, which may include the memory 360 and which may be the entire UE 350 or a component of the UE 350, such as the TX processor 368, the RX processor 356, and/or the controller/processor 359). One or more of the illustrated operations may be omitted, transposed, or contemporaneous. In FIG. 7, optional aspects are illustrated with a dashed line. The method provides for improved communication between a UE and a network and enables a UE to determine when to perform a two-step RACH procedure attempt and when to perform a four-step RACH procedure attempt when a fallback timer is configured. Thus, aspects may improve the efficiency of the UE accessing the network for data transmissions.

At 702, the UE may receive configuration information associated with a RACH procedure, as described in connection with the configuration information 610 of FIG. 6. The receiving of the configuration information may be performed, for example, by a reception component 904 of the apparatus 902 of FIG. 9. For example, the configuration information may indicate whether the network supports a two-step RACH procedure and, if the two-step RACH procedure is supported, whether a fallback time is configured for the UE. In some examples, the configuration information may indicate one or more UE access classes for which the network supports the two-step RACH procedure. The configuration information may additionally or alternatively include one or more parameter(s) associated with the two-step RACH procedure, such as a payload size (and/or a set of payload sizes), a Reference Signal Received Power (RSRP) threshold, a path loss threshold, a fallback timer setting (e.g., a duration or a maximum quantity), a first-type random access message transmittal count threshold (e.g., a msg1 transmittal count threshold), and/or a second-type random access message transmittal count threshold (e.g., a msgA transmittal count threshold). In some examples, the UE may receive the configuration information, including the one or more parameter(s), via system information while the UE is operating in a connected mode, operating in an idle mode, or operating in an inactive mode. In some examples, the UE may receive the configuration information, including the one or more parameter(s), via dedicated signaling while the UE is operating in a connected mode.

At 704, the UE determines that a fallback timer associated with a two-step random access procedure is configured for the UE, as described in connection with 612 of FIG. 6. The determining that the fallback timer is configured for the UE may be performed, for example, by a fallback timer component 930 of the apparatus 902. For example, the UE may determine that the fallback timer is configured based on the one or more parameter(s) included in the configuration information. In some examples, the fallback timer may be a timer. In some examples, the fallback timer may be a counter.

At 706, the UE may measure a reference signal, as described in connection with 612 of FIG. 6. The measuring of the reference signal may be performed by, for example, a measurement component 918 of the apparatus 902. In some examples, the reference signal may be comprised in a Synchronization Signal Block (SSB). In some examples, the reference signal may comprise a channel state information reference signal (CSI-RS). In some examples, the UE may select the reference signal to measure based on a predetermined rule. In some examples, the UE may select the reference signal to measure from among a plurality of reference signals received by the UE and based on respective reference signal measurements.

At 708, the UE may compare a measurement of the reference signal to at least one parameter, as described in connection with 612 of FIG. 6. The comparing of the reference signal measurement to the at least one parameter may be performed, for example, by a comparison component 920 of the apparatus 902. In some examples, the UE may compare the reference signal measurement to a threshold associated with the at least one parameter. For example, if the reference signal measurement is an RSRP measurement, the UE may compare the RSPR measurement to the RSRP threshold included in the configuration information.

In some examples, if the reference signal measurement is a path loss measurement, the UE may compare the path loss measurement to the path loss threshold included in the configuration.

At 710, the UE generates a random access message based at least on the fallback timer being configured for the UE, as described in connection with 614 of FIG. 6. The generating of the random access message may be performed, for example, by a generation component 910 of the apparatus 902. In some examples, the UE may generate a first-type random access message associated with a four-step random access procedure and including a preamble without a payload (e.g., the msg1). In some examples, the UE may generate a second-type random access message associated with the two-step random access procedure and including the preamble and a payload (e.g., the msgA).

In some examples, the generating of the random access message is further based on at least one parameter of the configuration information. For example, the UE may determine to perform the two-step random access procedure and generate the second-type random access message when the measurement of the reference signal satisfies a threshold associated with the at least one parameter (at 708). For example, when the measurement of the reference signal comprises an RSRP of the reference signal, the UE may determine to generate the second-type random access message when the RSRP of the reference signal is greater than or equal to the RSRP threshold. In some examples, when the measurement of the reference signal comprises a path loss measurement associated with the reference signal, the UE may determine to generate the second-type random access message when the path loss measurement is less than or equal to the path loss threshold. In some examples, when the measurement of the reference signal does not satisfy the threshold associated with the at least one parameter, then the UE may determine to perform the four-step random access procedure and generate the first-type random access message.

At 712, the UE performs a random access attempt by transmitting the random access message, as described in connection with the random access message 616 of FIG. 6. The transmitting of the random access message may be performed, for example, by a transmission component 906 of the apparatus 902.

At 714, the UE may increment a random access message transmittal count associated with the random access message, as described in connection with 616 of FIG. 6. The incrementing of the random access message transmittal count associated with the random access message may be performed, for example, by an increment component 922 of the apparatus 902. For example, after transmitting a second-type random access message (e.g., the msgA), the UE may increment a second-type random access message transmittal count. The UE may increment a first-type random access message transmittal count after transmitting a first-type random access message (e.g., the msg1).

At 716, the UE may determine whether to repeat transmission of the random access message, as described in connection with 612 and 620 of FIG. 6. The determining of whether to repeat transmission of the random access message may be performed, for example, by a count component 924 and a repeat component 926 of the apparatus 902. In some examples, the UE may determine whether the random access message transmittal count satisfies a respective random access message transmittal count threshold if a response message is not received from the base station. For example, the UE may determine to repeat a transmission of the random access message in response to detecting a re-transmission triggering event in which the UE has not received a response message, for example, from the base station. In some such examples, the UE may determine to repeat the transmission of the random access message when the respective random access message transmittal count satisfies the corresponding random access message transmittal count threshold and the fallback timer is configured (and active) for the UE. However, if the UE determines that the fallback timer is not active and the random access message transmit count does not satisfy the corresponding random access message transmittal count threshold, the UE may determine to terminate performing any RACH procedures.

For example, if the random access message is a second-type random access message, the UE may compare the second-type random access message transmittal count to a second-type random access message transmittal count threshold, and if the second-type random access message count threshold is satisfied, the UE may determine to repeat the transmission of the random access message (e.g. the second-type random access message). In some examples, the determining of whether to repeat transmission of the random access message (e.g., the second-type random access message) may also be based on whether the fallback timer is active. For example, if the UE determines that the fallback timer is configured and active, then the UE may determine to repeat the transmission of the random access message (e.g. the second-type random access message). In some such examples, if the UE determines that the fallback timer is not active and/or that the random access message count does not satisfy the respective random access message transmittal count threshold, then the UE may determine not to repeat transmission of the random access message. For example, the UE may generate a first-type random access message to transmit instead of repeating transmission of the second-type random access message.

At 718, the UE may repeat transmission of the random access message (e.g., the second-type random access message) or transmit a new random access message (e.g., the first-type random access message), as described in connection with 612 of FIG. 6. The retransmission of the random access message or the transmission of a new random access message may be performed, for example, by the transmission component 906 of the apparatus 902.

At 720, the UE may receive a random access response message from the base station, as described in connection with 620 of FIG. 6. The receiving of the random access response message may be performed, for example, by the reception component 904 of the apparatus 902. In some examples, the UE may use a RNTI to receive the random access response message. In some examples, the UE may use an RA-RNTI to receive the random access response message, for example, while the UE is operating in an idle mode or an inactive mode. In some examples, the UE may use a C-RNTI to receive the random access response message, for example, while the UE is operating in the connected mode.

In some examples in which the UE is performing the two-step RACH procedure, the random access response message may include an uplink grant and an identifier associated with the UE. In some such examples, the UE may determine that the base station successfully processed (e.g., decoded) the second-type random access message (e.g., transmitted at 712 or retransmitted at 718).

However, in some examples, the random access response message may include an uplink grant and information indicating a failure to decode the payload of the second-type random access message. In some such examples, the UE may transmit, at 722, another random access message when the random access response message indicates an unsuccessful decoding of the transmitted random access message, as described in connection with 612 and 614 of FIG. 6. The transmitting of another random access message may be performed, for example, by the transmission component 906 and the RACH component 912 of the apparatus 902. In some examples, the UE may transition to performing the four-step RACH procedure by generating and transmitting a third-type random access message including the payload (e.g., the msg3 416 of the four-step RACH procedure 410).

Figure 8:
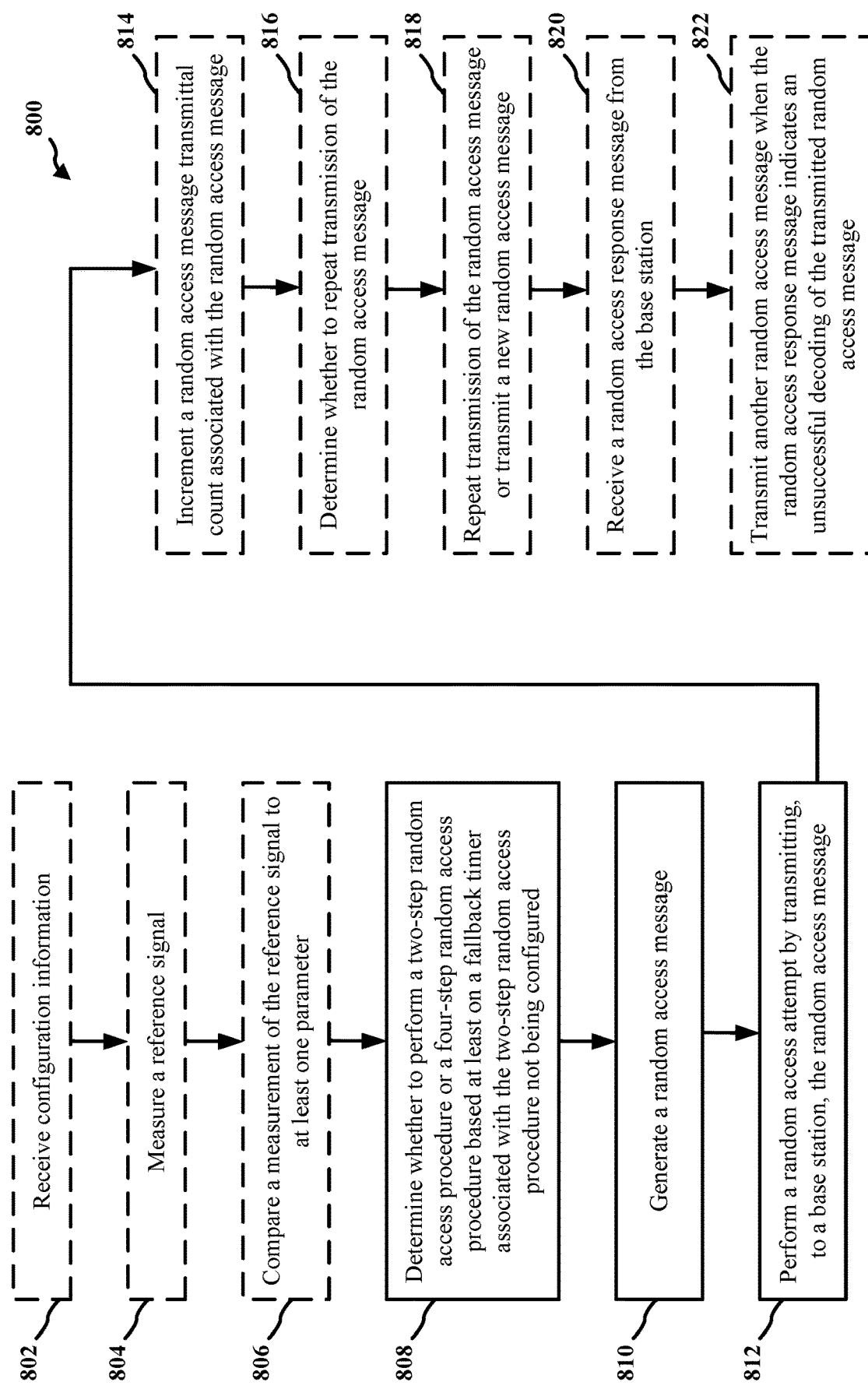
FIG. 8 is a flowchart of a method of wireless communication for a UE to perform a random access procedure.

FIG. 8 is a flowchart 800 of a method of wireless communication. The method may be performed by a UE (e.g., the UE 104 of FIG. 1, the UE 350 of FIG. 3, the UE 402 of FIG. 4, the UE 502 of FIG. 5, the UE 602 of FIG. 6, the UE 1250 of FIG. 12, the apparatus 902/902' of FIGS. 9 and 10, respectively, and/or the processing system 1014, which may include the memory 360 and which may be the entire UE 350 or a component of the UE 350, such as the TX processor 368, the RX processor 356, and/or the controller/processor 359). One or more of the illustrated operations may be omitted, transposed, or contemporaneous. In FIG. 8, optional aspects are illustrated with a dashed line. The method provides for improved communication between a UE and a network and enables a UE to determine when to perform a two-step RACH procedure attempt and when to perform a four-step RACH procedure attempt when a fallback timer is not configured. Thus, aspects may improve the efficiency of the UE accessing the network for data transmissions.

At 802, the UE may receive configuration information associated with a RACH procedure, as described in connection with the configuration information 610 of FIG. 6. The receiving of the configuration information may be performed, for example, by a reception component 904 of the apparatus 902 of FIG. 9. For example, the configuration information may indicate whether the network supports a two-step RACH procedure and, if the two-step RACH procedure is supported, whether a fallback time is configured for the UE. In some examples, the configuration information may indicate one or more UE access classes for which the network supports the two-step RACH procedure. The configuration information may additionally or alternatively include one or more parameter(s) associated with the two-step RACH procedure, such as a payload size (and/or a set of payload sizes), a Reference Signal Received Power (RSRP) threshold, a path loss threshold, a fallback timer setting (e.g., a duration or a maximum quantity), a first-type random access message transmittal count threshold (e.g., a msg1 transmittal count threshold), and/or a second-type random access message transmittal count threshold (e.g., a msgA transmittal count threshold). In some examples, the UE may receive the configuration information, including the one or more parameter(s), via system information while the UE is operating in a connected mode, operating in an idle mode, or operating in an inactive mode. In some examples, the UE may receive the configuration information, including the one or more parameter(s), via dedicated signaling while the UE is operating in a connected mode.

At 804, the UE may measure a reference signal, as described in connection with 612 of FIG. 6. The measuring of the reference signal may be performed by, for example, a measurement component 918 of the apparatus 902. In some examples, the reference signal may be comprised in a Synchronization Signal Block (SSB). In some examples, the reference signal may comprise a channel state information reference signal (CSI-RS). In some examples, the UE may select the reference signal to measure based on a predetermined rule. In some examples, the UE may select the reference signal to measure from among a plurality of reference signals received by the UE and based on respective reference signal measurements.

At 806, the UE may compare a measurement of the reference signal to at least one parameter, as described in connection with 612 of FIG. 6. The comparing of the reference signal measurement to the at least one parameter may be performed, for example, by a comparison component 920 of the apparatus 902. In some examples, the UE may compare the reference signal measurement to a threshold associated with the at least one parameter. For example, if the reference signal measurement is an RSRP measurement, the UE may compare the RSPR measurement to the RSRP threshold included in the configuration information. In some examples, if the reference signal measurement is a path loss measurement, the UE may compare the path loss measurement to the path loss threshold included in the configuration.

At 808, the UE determines whether to perform a two-step RACH procedure or a four-step RACH procedure based at least on a fallback timer associated with the two-step RACH procedure not being configured, as described in connection with 612 of FIG. 6. The determining that the fallback timer is not configured for the UE may be performed, for example, by a fallback timer component 930 of the apparatus 902. For example, the UE may determine that the fallback timer is not configured based on the one or more parameter(s) included in the configuration information.

In some examples, the determining of whether to perform the two-step RACH procedure or the four-step RACH procedure may be further based on at least one parameter of the configuration information. For example, the UE may determine to perform the two-step random access procedure when the measurement of the reference signal satisfies a threshold associated with the at least one parameter (at 806). For example, when the measurement of the reference signal comprises an RSRP of the reference signal, the UE may determine to perform the two-step RACH procedure when the RSRP of the reference signal is greater than or equal to the RSRP threshold. In some examples, when the measurement of the reference signal comprises a path loss measurement associated with the reference signal, the UE may determine to perform the two-step RACH procedure when the path loss measurement is less than or equal to the path loss threshold. In some examples, when the measurement of the reference signal does not satisfy the threshold associated with the at least one parameter, then the UE may determine to perform the four-step random access procedure.

At 810, the UE generates a random access message, as described in connection with 614 of FIG. 6. The generating of the random access message may be performed, for example, by a generation component 910 of the apparatus 902. In some examples, the UE may generate a first-type random access message associated with a four-step random access procedure and including a preamble without a payload (e.g., the msg1). In some examples, the UE may generate a second-type random access message associated with the two-step random access procedure and including the preamble and a payload (e.g., the msgA).

At 812, the UE performs a random access attempt by transmitting the random access message, as described in connection with the random access message 616 of FIG. 6.

The transmitting of the random access message may be performed, for example, by a transmission component 906 of the apparatus 902.

At 814, the UE may increment a random access message transmittal count associated with the random access message, as described in connection with 616 of FIG. 6. The incrementing of the random access message transmittal count associated with the random access message may be performed, for example, by an increment component 922 of the apparatus 902. For example, after transmitting a second-type random access message (e.g., the msgA), the UE may increment a second-type random access message transmittal count. The UE may increment a first-type random access message transmittal count after transmitting a first-type random access message (e.g., the msg1).

At 816, the UE may determine whether to repeat transmission of the random access message, as described in connection with 612 and 620 of FIG. 6. The determining of whether to repeat transmission of the random access message may be performed, for example, by a count component 924 and a repeat component 926 of the apparatus 902. In some examples, the UE may determine whether the random access message transmittal count satisfies a respective random access message transmittal count threshold if a response message is not received from the base station. For example, the UE may determine to repeat a transmission of the random access message in response to detecting a re-transmission triggering event in which the UE has not received a response message, for example, from the base station. In some such examples, the UE may determine to repeat the transmission of the random access message when the respective random access message transmittal count satisfies the corresponding random access message transmittal count threshold. However, if the UE determines that the random access message transmit count does not satisfy the corresponding random access message transmittal count threshold, the UE may determine to terminate performing any RACH procedures.

For example, if the random access message is a second-type random access message, the UE may compare the second-type random access message transmittal count to a second-type random access message transmittal count threshold, and if the second-type random access message count threshold is satisfied, the UE may determine to repeat the transmission of the random access message (e.g. the second-type random access message). In some examples, if the UE determines that the random access message count does not satisfy the respective random access message transmittal count threshold, then the UE may determine not to repeat transmission of the random access message. For example, the UE may generate a first-type random access message to transmit instead of repeating transmission of the second-type random access message.

At 818, the UE may repeat transmission of the random access message (e.g., the second-type random access message) or transmit a new random access message (e.g., the first-type random access message), as described in connection with 612 of FIG. 6. The retransmission of the random access message or the transmission of a new random access message may be performed, for example, by the transmission component 906 of the apparatus 902.

At 820, the UE may receive a random access response message from the base station, as described in connection with 620 of FIG. 6. The receiving of the random access response message may be performed, for example, by the reception component 904 of the apparatus 902. In some examples, the UE may use a RNTI to receive the random access response message. In some examples, the UE may use an RA-RNTI to receive the random access response message, for example, while the UE is operating in an idle mode or an inactive mode. In some examples, the UE may use a C-RNTI to receive the random access response message, for example, while the UE is operating in the connected mode.

In some examples in which the UE is performing the two-step RACH procedure, the random access response message may include an uplink grant and an identifier associated with the UE. In some such examples, the UE may determine that the base station successfully processed (e.g., decoded) the second-type random access message (e.g., transmitted at 812 or retransmitted at 818).

However, in some examples, the random access response message may include an uplink grant and information indicating a failure to decode the payload of the second-type random access message. In some such examples, the UE may transmit, at 822, another random access message when the random access response message indicates an unsuccessful decoding of the transmitted random access message, as described in connection with 612 and 614 of FIG. 6. The transmitting of another random access message may be performed, for example, by the transmission component 906 and the RACH component 912 of the apparatus 902. In some examples, the UE may transition to performing the four-step RACH procedure by generating and transmitting a third-type random access message including the payload (e.g., the msg3 416 of the four-step RACH procedure 410).

Figure 9:
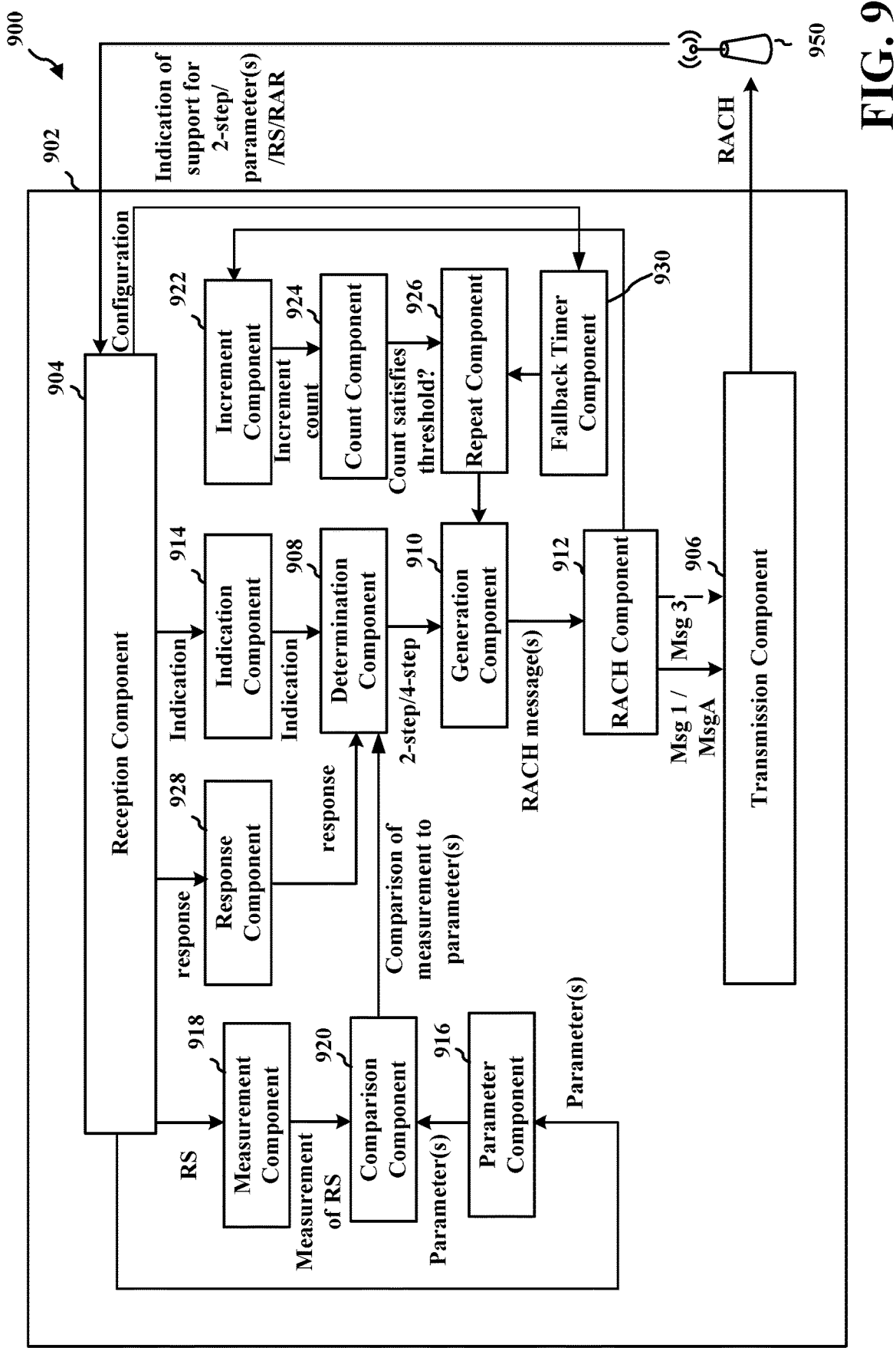
FIG. 9 is a conceptual data flow diagram illustrating the data flow between different means/components in an example apparatus.

FIG. 9 is a conceptual data flow diagram 900 illustrating the data flow between different means/components in an example apparatus 902. The apparatus may be a UE. The apparatus 902 may include a reception component 904 configured to receive downlink communication from a base station 950 (e.g., as described in connection with 702 and 802). The apparatus 902 may include a transmission component 906 configured to transmit uplink communication to the base station 950 (e.g., as described in connection 712, 718, 722, 812, 818, and 822). The apparatus 902 may include a determination component 908 configured to determine whether to perform a two-step RACH procedure or to perform a four-step RACH procedure (e.g., as described in connection 708 and 808). The apparatus 902 may include a generation component 910 configured to generate a random access message based on the determination provided by the determination component 908 (e.g., as described in connection with 710, 716, 722, 810, 816, and 822). In some examples, the random access message may be a first-type random access message including a preamble (e.g., the msg1) when the determining is to perform the four-step RACH procedure or the random access message may be a second-type random access message including a preamble and a payload (e.g., the msgA) when the determining is to perform the four-step RACH procedure. In some examples, the random access message may be a third-type random access message including a payload (e.g., the msg3) when a response message from the base station indicates that the base station unsuccessfully processed (e.g., decode) the payload of the second-type random access message.

The apparatus 902 may include a RACH component 912 configured to perform a RACH attempt by transmitting, to a base station, the random access message (e.g., as described in connection with 712 and 812).

The apparatus 902 may include an indication component 914 configured to receive, from the base station, an indication that indicates whether the base station supports a two-step RACH procedure (e.g., as described in connection with 702 and 802). In some examples, the determination component 908 may be configured to determine whether to generate the first-type random access message or the second-type random access message based on the indication.

The apparatus 902 may include a parameter component 916 configured to receive, from the base station, at least one parameter associated with the two-step RACH procedure (e.g., as described in connection with 702 and 802). In some examples, the at least one parameter may include one or more of a payload size (and/or a set of payload sizes), a Reference Signal Received Power (RSRP) threshold, a path loss threshold, a fallback timer setting, a first-type random access message transmittal count threshold, or a second-type random access message transmittal count threshold. In some examples, the determination component 908 may be configured to determine whether to generate the first random access message or the second random access message based on the at least one parameter.

The apparatus 902 may include a measurement component 918 configured to measure a reference signal and a comparison component 920 configured to compare a measurement of the reference signal to the at least one parameter (e.g., as described in connection with 704/804 and 706/806, respectively). In some examples, the determination component 908 may be configured to determine to generate the second-type random access message when the measurement of the reference signal satisfies a threshold associated with the at least one parameter. In another example, the determination component 908 may be configured to determine to generate the first-type random access message when the measurement of the at least one reference signal does not satisfy a threshold associated with the at least one parameter.

In some examples, the random access message may be the second-type random access message including a preamble and a payload, and the apparatus 902 may include an increment component 922 configured to increment a second-type random access message transmittal count after the transmitting of the second-type random access message (e.g., as described in connection 714 and 814). The apparatus 902 may include a count component 924 configured to determine whether the second-type random access message transmittal count satisfies a second-type random access message transmittal count threshold if a response message is not received from the base station and a repeat component 926 configured to determine whether to repeat transmission of the second-type random access message or to perform the four-step RACH procedure by generating the first-type random access message based on whether the second-type random access message transmittal count satisfies the second-type random access message transmittal count threshold (e.g., as described in connection with 716 and 816).

The apparatus 902 may include a response component 928 configured to receive, from the base station, a random access response message in response to the transmission of the second-type random access message including the preamble and the payload (e.g., as described in connection with 720 and 820). In some examples, the random access response message may include an uplink grant and information indicating a failure to decode the payload of the second-type random access message. In some examples, the RACH component 912 may be configured to transmit, to the base station, a third-type random access message comprising the payload based on the uplink grant, the third-type random access message associated with the four-step RACH procedure. In some examples, the determination component 908 may be configured to determine whether to perform another RACH attempt using the two-step RACH procedure or the four-step RACH procedure when no response to the third-type random access message is received or when the UE receives a response to the third-type random access message indicating another failure to decode the payload.

The apparatus 902 may include a fallback timer component 930 configured to determine whether a fallback timer associated with the two-step random access procedure is configured for the UE (e.g., as describe in connection with 704).

The apparatus 902 may include additional components that perform each of the blocks of the algorithms in the aforementioned flowcharts of FIGS. 7 and/or 8. As such, each block in the aforementioned flowcharts of FIGS. 7 and/or 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 10:
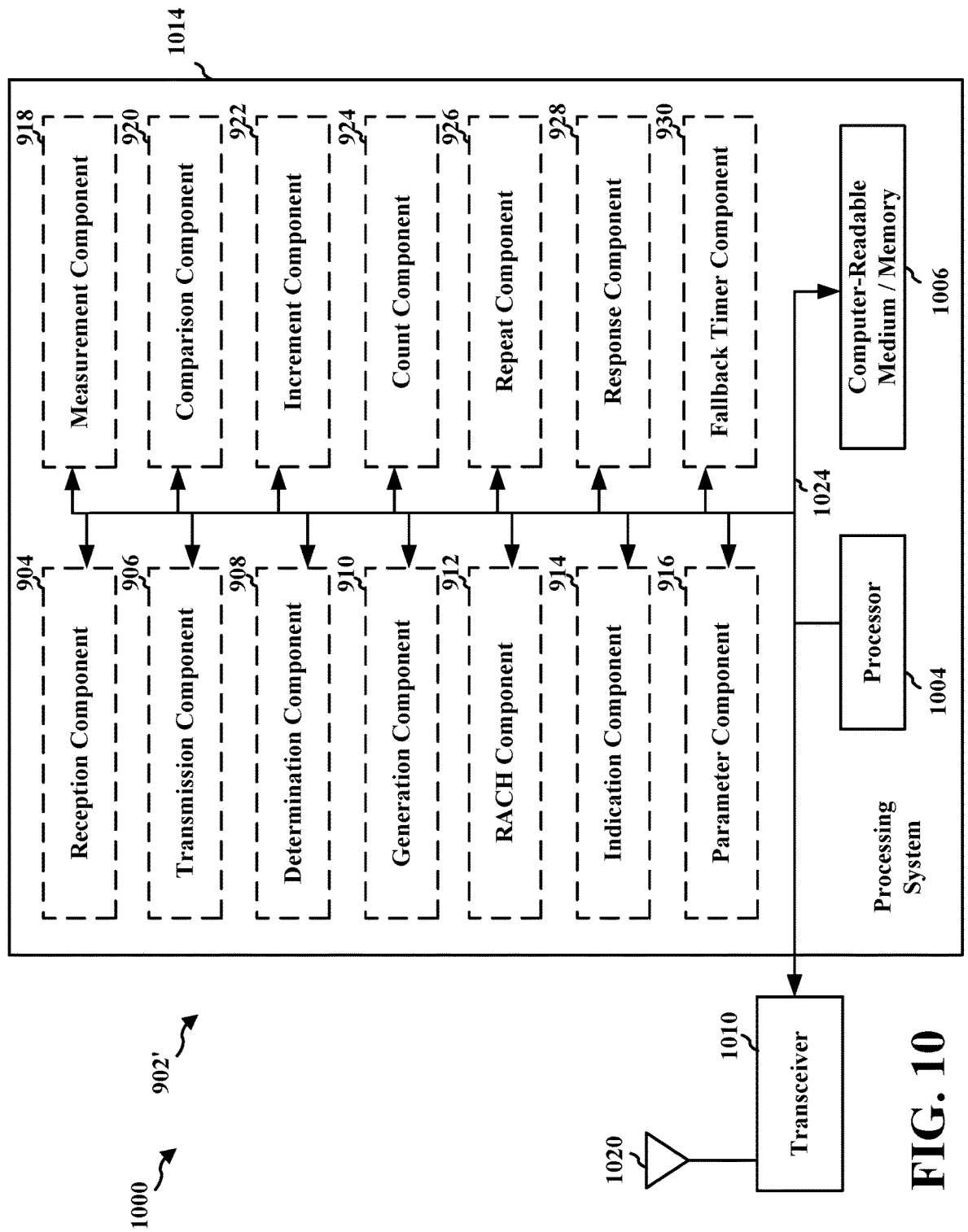
FIG. 10 is a diagram illustrating an example of a hardware implementation for an apparatus employing a processing system.

FIG. 10 is a diagram 1000 illustrating an example of a hardware implementation for an apparatus 902' employing a processing system 1014. The processing system 1014 may be implemented with a bus architecture, represented generally by the bus 1024. The bus 1024 may include any number of interconnecting buses and bridges depending on the specific application of the processing system 1014 and the overall design constraints. The bus 1024 links together various circuits including one or more processors and/or hardware components, represented by the processor 1004, the components 904, 906, 908, 910, 912, 914, 916, 918, 920, 922, 924, 926, 928, 930, and the computer-readable medium/memory 1006. The bus 1024 may also link various other circuits such as timing sources, peripherals, voltage regulators, and power management circuits, which are well known in the art, and therefore, will not be described any further.

The processing system 1014 may be coupled to a transceiver 1010. The transceiver 1010 is coupled to one or more antennas 1020. The transceiver 1010 provides a means for communicating with various other apparatus over a transmission medium. The transceiver 1010 receives a signal from the one or more antennas 1020, extracts information from the received signal, and provides the extracted information to the processing system 1014, specifically the reception component 904. In addition, the transceiver 1010 receives information from the processing system 1014, specifically the transmission component 906, and based on the received information, generates a signal to be applied to the one or more antennas 1020. The processing system 1014 includes a processor 1004 coupled to a computer-readable medium/memory 1006. The processor 1004 is responsible for general processing, including the execution of software stored on the computer-readable medium/memory 1006. The software, when executed by the processor 1004, causes the processing system 1014 to perform the various functions described supra for any particular apparatus. The computer-readable medium/memory 1006 may also be used for storing data that is manipulated by the processor 1004 when executing software. The processing system 1014 further includes at least one of the components 904, 906, 908, 910, 912, 914, 916, 918, 920, 922, 924, 926, 928, 930. The components may be software components running in the processor 1004, resident/stored in the computer readable medium/memory 1006, one or more hardware components coupled to the processor 1004, or some combination thereof. The processing system 1014 may be a component of the UE 350 and may include the memory 360 and/or at least one of the TX processor 368, the RX processor 356, and the controller/processor 359. Alternatively, the processing system 1014 may be the entire UE (e.g., see 350 of FIG. 3).

In one configuration, the apparatus 902/902' for wireless communication includes means for determining that a fallback timer associated with a two-step random access procedure is configured for the UE. The apparatus 902/902' may also include means for generating a random access message based at least on the determining, where the random access message is one of a first-type random access message associated with a four-step random access procedure and including a preamble or a second-type random access message associated with the two-step random access procedure and including the preamble and a payload. The apparatus 902/902' may also include means for performing a random access attempt by transmitting, to a base station, the random access message. The apparatus 902/902' may also include means for receiving, from the base station, at least one parameter associated with the two-step random access procedure, the at least one parameter including one or more of a payload size, a set of payload sizes, a Reference Signal Received Power (RSRP) threshold, a path loss threshold, a fallback timer setting, a first-type random access message transmittal count threshold, or a second-type random access message transmittal count threshold. The apparatus 902/902' may also include means for generating the random access message further based on the at least one parameter. The apparatus 902/902' may also include means for measuring a reference signal. The apparatus 902/902' may also include means for comparing a measurement of the reference signal to the at least one parameter. The apparatus 902/902' may also include means for determining to generate the second-type random access message when the measurement of the reference signal satisfies a threshold associated with the at least one parameter. The apparatus 902/902' may also include means for selecting the reference signal to measure based on a predetermined rule. The apparatus 902/902' may also include means for selecting the reference signal to measure from among a plurality of reference signals received by the UE and based on respective reference signal measurements. The apparatus 902/902' may also include means for determining to generate the second-type random access message when the measurement of the reference signal comprises a Reference Signal Received Power (RSRP) of the reference signal and the RSRP of the reference signal is greater than or equal to the RSRP threshold. The apparatus 902/902' may also include means for determining to generate the second-type random access message when the measurement of the reference signal comprises a path loss measurement associated with the reference signal and the path loss measurement is less than or equal to the path loss threshold. The apparatus 902/902' may also include means for measuring at least one reference signal. The apparatus 902/902' may also include means for comparing a measurement of the at least one reference signal to the at least one parameter. The apparatus 902/902' may also include means for determining to generate the first-type random access message when the measurement of the at least one reference signal does not satisfy a threshold associated with the at least one parameter. The apparatus 902/902' may also include means for receiving, from the base station, an indication that indicates whether the base station supports the two-step random access procedure, wherein the fallback timer is configured when the base station supports the two-step random access procedure. The apparatus 902/902' may also include means for generating the random access message further based on an access class associated with the UE. The apparatus 902/902' may also include means for incrementing a second-type random access message transmittal count after the transmitting of the second-type random access message. The apparatus 902/902' may also include means for determining whether the second-type random access message transmittal count satisfies a second-type random access message transmittal count threshold if a response message is not received from the base station. The apparatus 902/902' may also include means for determining whether to repeat transmission of the second-type random access message or to generate the first-type random access message based on whether the second-type random access message transmittal count satisfies the second-type random access message transmittal count threshold. The apparatus 902/902' may also include means for determining whether to repeat the transmission of the second-type random access message or to perform the four-step random access procedure further based on whether the fallback timer is active for the UE. The apparatus 902/902' may also include means for generating the first-type random access message when the second-type random access message transmittal count does not satisfy the second-type random access message transmittal count threshold. The apparatus 902/902' may also include means for repeating the transmission of the second-type random access message while the fallback timer is active and if the second-type random access message transmittal count is less than the second-type random access message transmittal count threshold. The apparatus 902/902' may also include means for receiving, from the base station, a random access response message in response to the transmission of the second-type random access message, the random access response message including an uplink grant and information indicating a failure to decode the payload of the second-type random access message. The apparatus 902/902' may also include means for transmitting, to the base station, a third-type random access message comprising the payload based on the uplink grant, the third-type random access message associated with the four-step random access procedure. The apparatus 902/902' may also include means for determining whether to perform another random access attempt using the two-step random access procedure or the four-step random access procedure when the fallback timer is active and no response to the third-type random access message is received or when the fallback timer is active and a received response to the third-type random access message indicates another failure to decode the payload. The apparatus 902/902' may also include means for receiving, from the base station, a random access response message in response to the transmission of the second-type random access message, the random access response message including an uplink grant and an identifier associated with the UE. The apparatus 902/902' may also include means for using a radio network temporary identifier (RNTI) to receive a response message associated with the two-step random access procedure or the four-step random access procedure. The apparatus 902/902' may also include means for using, while operating in an idle mode or an inactive mode, a random access radio network temporary identifier (RA-RNTI) to receive a response message associated with the two-step random access procedure or the four-step random access procedure. The apparatus 902/902' may also include means for using a cell radio network temporary identifier (C-RNTI) to receive a response message associated with a two-step random access procedure while the UE is operating in a connected mode.

In an additional or alternative configuration, the apparatus 902/902' for wireless communication includes means for determining whether to perform a two-step random access procedure or a four-step random access procedure based at least on a fallback timer associated with the two-step random access procedure not being configured. The apparatus 902/902' may also include means for generating a random access message based on the determining, where the random access message is one of a first-type random access message associated with a four-step random access procedure and including a preamble or a second-type random access message associated with the two-step random access procedure and including the preamble and a payload. The apparatus 902/902' may also include means for performing a random access attempt by transmitting, to a base station, the random access message. The apparatus 902/902' may also include means for receiving, from the base station, at least one parameter including one or more of a payload size, a set of payload sizes, a Reference Signal Received Power (RSRP) threshold, a path loss threshold, a fallback timer setting, a first-type random access message transmittal count threshold, or a second-type random access message transmittal count threshold. The apparatus 902/902' may also include means for determining whether to perform the two-step random access procedure or the four-step random access procedure is further based on the at least one parameter. The apparatus 902/902' may also include means for measuring a reference signal. The apparatus 902/902' may also include means for comparing a measurement of the reference signal to the at least one parameter. The apparatus 902/902' may also include means for determining to perform the two-step random access procedure when the measurement of the reference signal satisfies a threshold associated with the at least one parameter. The apparatus 902/902' may also include means for selecting the reference signal to measure based on a predetermined rule. The apparatus 902/902' may also include means for selecting the reference signal to measure from among a plurality of reference signals received by the UE and based on respective reference signal measurements. The apparatus 902/902' may also include means for determining to perform the two-step random access procedure when the measurement of the reference signal comprises a Reference Signal Received Power (RSRP) of the reference signal and the RSRP of the reference signal satisfies the RSRP threshold. The apparatus 902/902' may also include means for determining to perform the two-step random access procedure when the measurement of the reference signal comprises a path loss measurement associated with the reference signal and the path loss measurement satisfies the path loss threshold. The apparatus 902/902' may also include means for measuring at least one reference signal. The apparatus 902/902' may also include means for comparing a measurement of the at least one reference signal to the at least one parameter. The apparatus 902/902' may also include means for determining to perform the four-step random access procedure when the measurement of the at least one reference signal does not satisfy a threshold associated with the at least one parameter. The apparatus 902/902' may also include means for receiving, from the base station, an indication that indicates whether the base station supports a two-step random access procedure, where the determining of whether to perform the two-step random access procedure or the four-step random access procedure is further based on the indication. The apparatus 902/902' may also include means for determining whether to perform the two-step random access procedure or the four-step random access procedure further based on an access class associated with the UE. The apparatus 902/902' may also include means for incrementing a second-type random access message transmittal count after the transmitting of the second-type random access message. The apparatus 902/902' may also include means for determining whether the second-type random access message transmittal count satisfies a second-type random access message transmittal count threshold if a response message is not received from the base station. The apparatus 902/902' may also include means for determining whether to repeat transmission of the second-type random access message or to perform the four-step random access procedure by generating the first-type random access message based on whether the second-type random access message transmittal count satisfies the second-type random access message transmittal count threshold. The apparatus 902/902' may also include means for performing the four-step random access procedure by generating the first-type random access message if the second-type random access message transmittal count does not satisfy the second-type random access message transmittal count threshold. The apparatus 902/902' may also include means for determining whether to repeat the transmission of the second-type random access message or to perform the four-step random access procedure by generating the first-type random access message based on a reference signal measurement if the second-type random access message transmittal count is less than the second-type random access message transmittal count threshold. The apparatus 902/902' may also include means for receiving, from the base station, a random access response message in response to the transmission of the second-type random access message, the random access response message including an uplink grant and information indicating a failure to decode the payload of the second-type random access message. The apparatus 902/902' may also include means for transmitting, to the base station, a third-type random access message comprising the payload based on the uplink grant, the third-type random access message associated with the four-step random access procedure. The apparatus 902/902' may also include means for determining whether to perform another random access attempt using the two-step random access procedure or the four-step random access procedure when no response to the third-type random access message is received or when a received response to the third-type random access message indicates another failure to decode the payload. The apparatus 902/902' may also include means for receiving, from the base station, a random access response message in response to the transmission of the second-type random access message, the random access response message including an uplink grant and an identifier associated with the UE. The apparatus 902/902' may also include means for using a radio network temporary identifier (RNTI) to receive a response message associated with a two-step random access procedure or a four-step random access procedure. The apparatus 902/902' may also include means for using, while operating in an idle mode or an inactive mode, a random access radio network temporary identifier (RA-RNTI) to receive a response message associated with a two-step random access procedure or a four-step random access procedure. The apparatus 902/902' may also include means for using a cell radio network temporary identifier (C-RNTI) to receive a response message associated with a two-step random access procedure while the UE is operating in a connected mode.

The aforementioned means may be one or more of the aforementioned components of the apparatus 902 and/or the processing system 1014 of the apparatus 902' configured to perform the functions recited by the aforementioned means. As described supra, the processing system 1014 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 11:
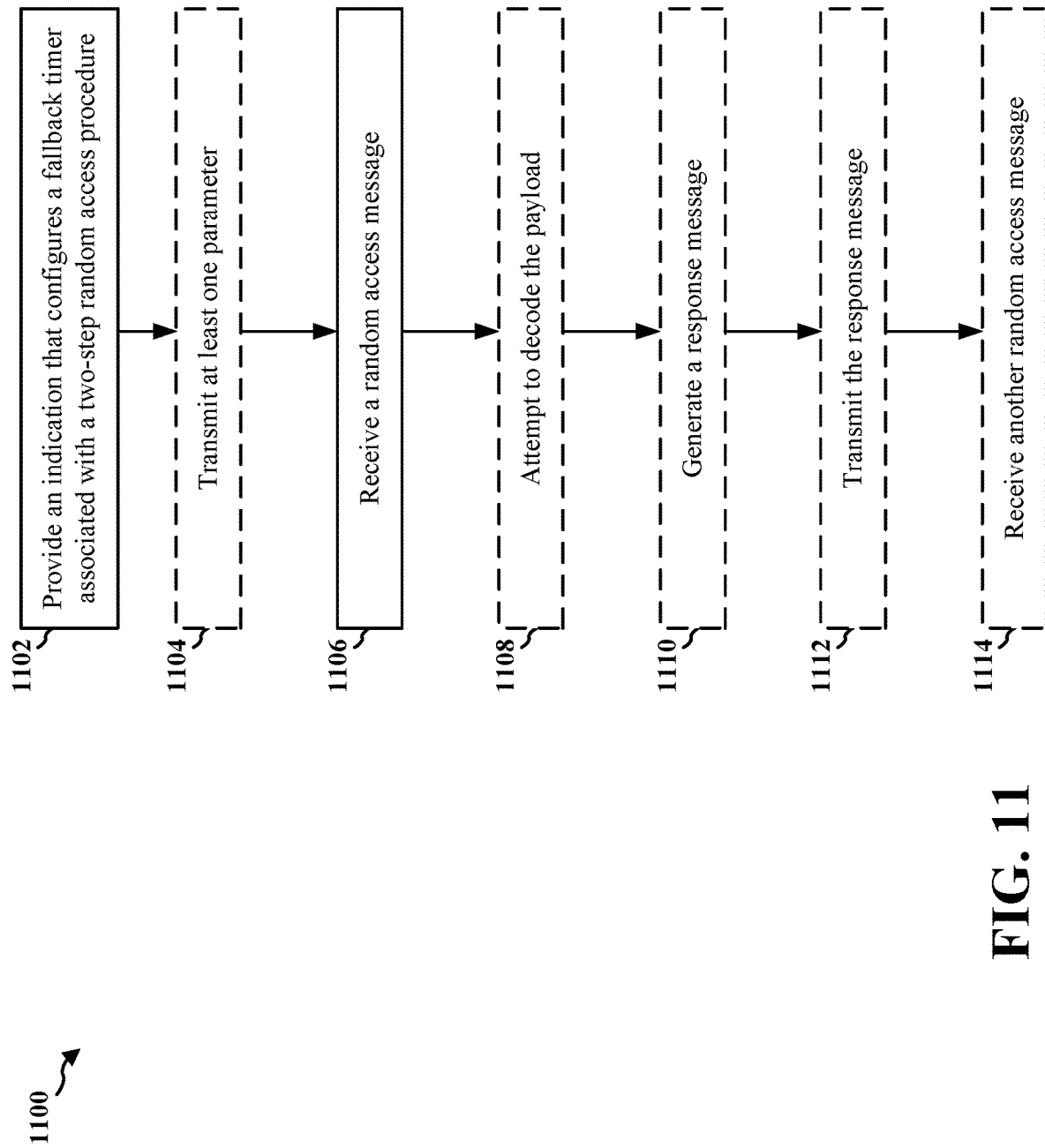
FIG. 11 is a flowchart of a method of wireless communication for a base station to perform a random access procedure.

FIG. 11 is a flowchart 1100 of a method of wireless communication. The method may be performed by a base station (e.g., base station 102/180 of FIG. 1, the base station 310 of FIG. 3, the base station 404 of FIG. 4, the base station 504 of FIG. 5, the base station 604 of FIG. 6, the base station 950 of FIG. 9, the apparatus 1302/1302' of FIGS. 13 and 14, respectively, and/or the processing system 1414, which may include the memory 360 and which may be the entire base station 310 or a component of the base station 310, such as the TX processor 316, the RX processor 370, and/or the controller/processor 375). One or more of the illustrated operations may be omitted, transposed, or contemporaneous. In FIG. 11, optional aspects are illustrated with a dashed line. The method provides for improved communication between a UE and a network when a fallback timer associated with a two-step RACH is configured. Aspects may improve the efficiency of performing uplink synchronization between the UE and the network.

At 1102, the base station provides an indication that configures a fallback timer associated with a two-step random access procedure, as described in connection with 610 of FIG. 6. The providing of the indication that configures the fallback timer may be performed, for example, by an indication component of FIG. 13. As discussed above, some base stations may support two-step RACH while others might not. By providing the indication that configures the fallback timer, the base station may indicate that the base station supports a two-step RACH procedure and the base station can guide the UE in selecting a way to initiate random access with the base station. In some examples, the base station may support two-step RACH on a UE access class basis. In some examples, the indication provided by the base station may identify the one or more UE access classes for which the base station supports the two-step RACH procedure.

At 1104, the base station may transmit at least one parameter associated with the two-step RACH procedure, for example, to the UE, as described in connection with 610 of FIG. 6. The transmitting of the at least one parameter may be performed, for example, by a parameter component 1312 of FIG. 13. For example, the base station may transmit one or more parameter(s) including a payload size (and/or a set of payload sizes), a Reference Signal Received Power (RSRP) threshold, a path loss threshold, a fallback timer setting, a first random access message transmittal count threshold (e.g., a msg1 transmittal count threshold), and/or a second random access message transmittal count threshold (e.g., a msgA transmittal count threshold). In some examples, the base station may transmit the indication configuring the fallback timer and/or the one or more parameter(s) via system information. In some examples, the base station may transmit the indication configuring the fallback timer and/or the one or more parameter(s) via dedicated signaling to the UE operating in a connected mode.

At 1106, the base station receives a random access message based at least in part on the indication, as described in connection with 616 of FIG. 6. The receiving of the random access message may be performed, for example, by the reception component 1304 of FIG. 13. In some examples, the random access message is a first-type random access message including a preamble without a payload (e.g., a msg1). In some examples, the random access message is a second-type random access message including the preamble and a payload (e.g., a msgA). In some examples, the random access message is a third-type random access message including the payload (e.g., a msg3).

At 1108, the base station may attempt to decode the payload of a second-type random access message, as described in connection with 618 of FIG. 6. The attempting to decode the payload may be performed, for example, by the decode component 1316 of FIG. 13. In some examples, the base station may successfully decode the payload. In some examples, the base station may unsuccessfully decode the payload.

At 1110, the base station may generate a response message in response to receiving the random access message, as described in connection with 618 of FIG. 6. The generating of the response message may be performed, for example, by the response component 1314 of FIG. 13. In some examples, the response message includes an uplink grant. In some examples, the base station may generate the response message based on the success or failure of the decoding of the payload. For example, if the base station successfully decodes the payload, the base station may generate the response message to also include timing advancement information, contention resolution information, and/or radio resource control (RRC) connection setup information. In some examples, if the base station is unable to decode the payload, the base station may generate the response message to also include information indicating the failure to decode the payload.

At 1112, the base station may transmit the response message to the UE, as described in connection with 620 of FIG. 6. The transmitting of the response message may be performed, for example, by the response component 1314, the provision component 1318, the failure component 1320, and/or the transmission component 1306 of FIG. 13.

At 1114, the base station may receive another random access message, as described in connection with 616 of FIG. 6. The receiving of another random access message may be performed, for example, by the reception component 1304 of FIG. 13. In some examples, the random access message may be a retransmission of a random access message. In some examples, the random access message may be a third-type random access message including the payload. For example, the base station may receive the third-type random access message in response to the response message indicating the failure to decode the payload of the second-type random access message. In some such examples, the base station may then generate and transmit a fourth-type random access message that is associated with the four-step RACH procedure (e.g., the msg4).

Figure 12:
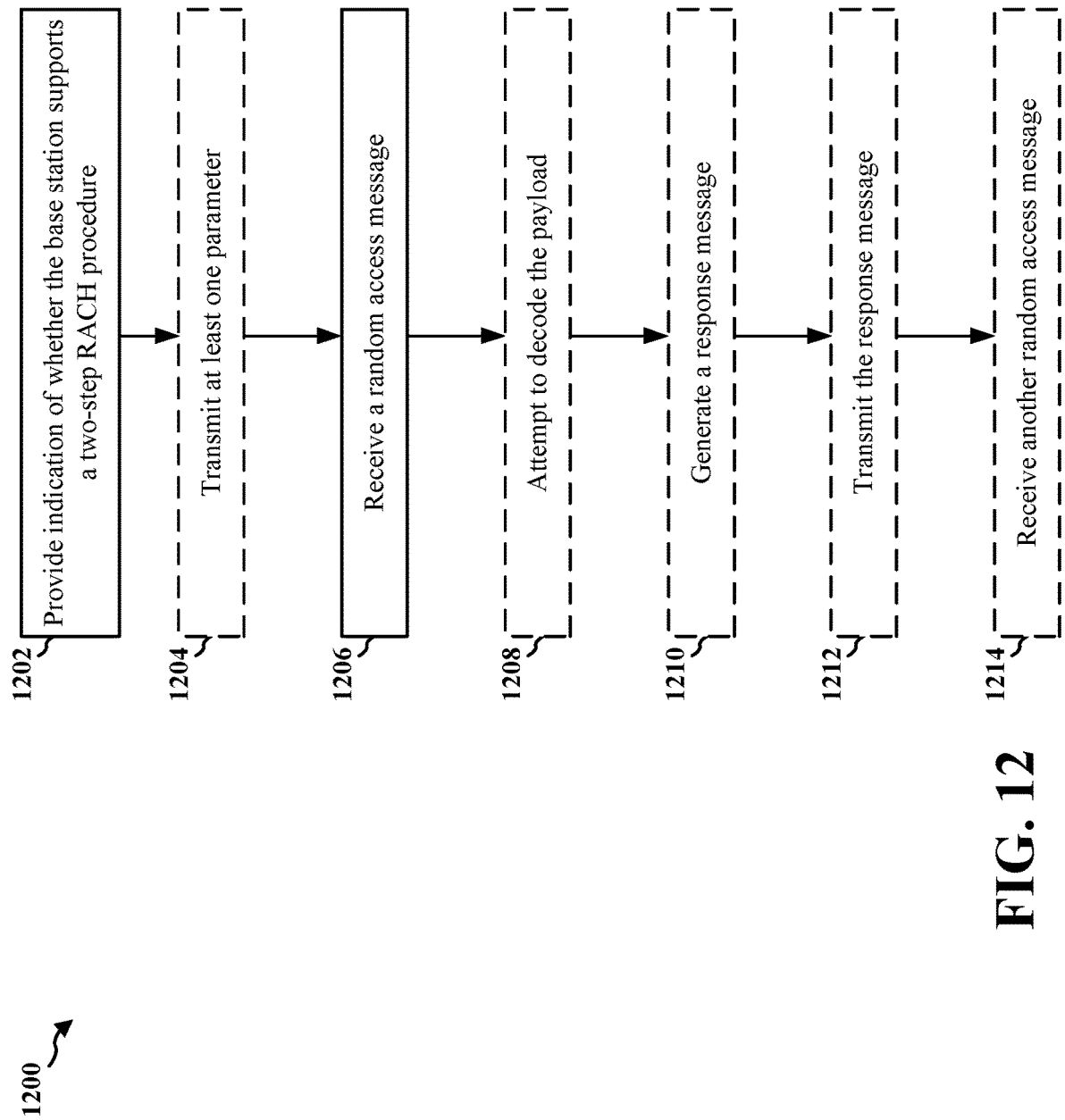
FIG. 12 is a flowchart of a method of wireless communication for a base station to perform a random access procedure.

FIG. 12 is a flowchart 1200 of a method of wireless communication. The method may be performed by a base station (e.g., base station 102/180 of FIG. 1, the base station 310 of FIG. 3, the base station 404 of FIG. 4, the base station 504 of FIG. 5, the base station 604 of FIG. 6, the base station 950 of FIG. 9, the apparatus 1302/1302' of FIGS. 13 and 14, respectively, and/or the processing system 1414, which may include the memory 360 and which may be the entire base station 310 or a component of the base station 310, such as the TX processor 316, the RX processor 370, and/or the controller/processor 375). One or more of the illustrated operations may be omitted, transposed, or contemporaneous. In FIG. 12, optional aspects are illustrated with a dashed line. The method provides for improved communication between a UE and a network when a fallback timer is not configured. Aspects may improve the efficiency of performing uplink synchronization between the UE and the network.

At 1202, the base station provides an indication of whether the base station supports a two-step RACH procedure, as described in connection with 610 of FIG. 6. The providing of the indication may be performed, for example, by an indication component of FIG. 13. As discussed above, some base stations may support two-step RACH while others might not. By providing the indication of whether the base station supports a two-step RACH procedure, the base station can guide the UE in selecting a way to initiate random access with the base station. In some examples, the base station may support two-step RACH on a UE access class basis. In some such examples, the indication provided by the base station may identify the one or more UE access classes for which the base station supports the two-step RACH procedure.

At 1204, the base station may transmit at least one parameter associated with the two-step RACH procedure, for example, to the UE, as described in connection with 610 of FIG. 6. The transmitting of the at least one parameter may be performed, for example, by a parameter component 1312 of FIG. 13. For example, the base station may transmit one or more parameter(s) including a payload size (and/or a set of payload sizes), a Reference Signal Received Power (RSRP) threshold, a path loss threshold, a fallback timer setting, a first random access message transmittal count threshold (e.g., a msg1 transmittal count threshold), and/or a second random access message transmittal count threshold (e.g., a msgA transmittal count threshold). In some examples, the base station may transmit the indication of whether the base station supports the two-step RACH procedure and/or the one or more parameter(s) via system information. In some examples, the base station may transmit the indication of whether the base station supports the two-step RACH procedure and/or the one or more parameter(s) via dedicated signaling to the UE operating in a connected mode.

At 1206, the base station receives a random access message based at least in part on the indication, as described in connection with 616 of FIG. 6. The receiving of the random access message may be performed, for example, by the reception component 1304 of FIG. 13. In some examples, the random access message is a first-type random access message including a preamble without a payload (e.g., a msg1). In some examples, the random access message is a second-type random access message including the preamble and a payload (e.g., a msgA). In some examples, the random access message is a third-type random access message including the payload (e.g., a msg3).

At 1208, the base station may attempt to decode the payload of a second-type random access message, as described in connection with 618 of FIG. 6. The attempting to decode the payload may be performed, for example, by the decode component 1316 of FIG. 13. In some examples, the base station may successfully decode the payload. In some examples, the base station may unsuccessfully decode the payload.

At 1210, the base station may generate a response message in response to receiving the random access message, as described in connection with 618 of FIG. 6. The generating of the response message may be performed, for example, by the response component 1314 of FIG. 13. In some examples, the response message includes an uplink grant. In some examples, the base station may generate the response message based on the success or failure of the decoding of the payload. For example, if the base station successfully decodes the payload, the base station may generate the response message to also include timing advancement information, contention resolution information, and/or radio resource control (RRC) connection setup information. In some examples, if the base station is unable to decode the payload, the base station may generate the response message to also include information indicating the failure to decode the payload.

At 1212, the base station may transmit the response message to the UE, as described in connection with 620 of FIG. 6. The transmitting of the response message may be performed, for example, by the response component 1314, the provision component 1318, the failure component 1320, and/or the transmission component 1306 of FIG. 13.

At 1214, the base station may receive another random access message, as described in connection with 616 of FIG. 6. The receiving of another random access message may be performed, for example, by the reception component 1304 of FIG. 13. In some examples, the random access message may be a retransmittal of a random access message. In some examples, the random access message may be a third-type random access message including the payload. For example, the base station may receive the third-type random access message in response to the response message indicating the failure to decode the payload of the second-type random access message. In some such examples, the base station may then generate and transmit a fourth-type random access message that is associated with the four-step RACH procedure (e.g., the msg4).

Figure 13:
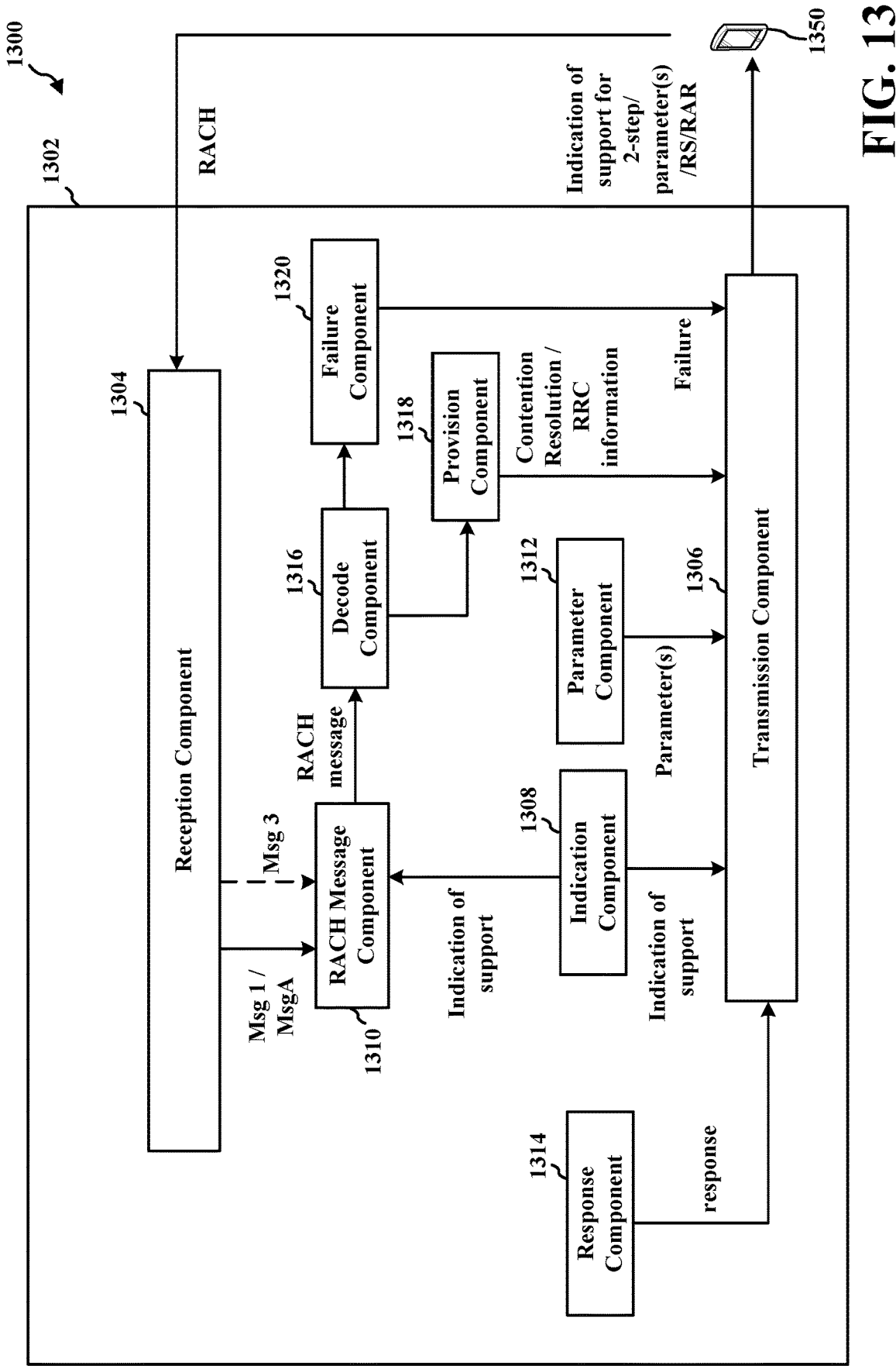
FIG. 13 is a conceptual data flow diagram illustrating the data flow between different means/components in an example apparatus.

FIG. 13 is a conceptual data flow diagram 1300 illustrating the data flow between different means/components in an example apparatus 1302. The apparatus may be a base station. The apparatus 1302 includes a reception component 1204 configured to receive uplink communication from UE(s) 1350 (e.g., as described in connection with 1106, 1114, 1206, and 1214) and a transmission component 1206 configured to transmit downlink communication to the UE 1350 (e.g., as described in connection with 1102, 1104, 1112, 1202, 1204, and 1212). The apparatus 1302 may include an indication component 1208 configured to provide to a UE, an indication of whether the base station supports a two-step RACH procedure and/or an indication that a fallback timer is configured (e.g., as described in connection with 1102 and 1202). The apparatus 1302 may include a RACH message component 1310 configured to receive, from the UE, a random access message based at least in part on the indication (e.g., as described in connection with 1106, 1114, 1206, and 1214). In some examples, the random access message may be a first-type random access message including a preamble. In some examples, the random access message may be a second-type random access message including the preamble and a payload. In some examples, the random access message may be a third-type random access message including the payload. The apparatus 1302 may include a parameter component 1312 configured to transmit, to the UE, at least one parameter associated with the two-step RACH procedure (e.g., as described in connection with 1104 and 1204). In some examples, the at least one parameter may include one or more of a payload size (and/or a set of payload sizes), a RSRP threshold, a path loss threshold, a fallback timer setting, a first random access message transmittal count threshold, or a second random access message transmittal count threshold. The apparatus 1302 may include a response component 1314 configured to generate a random access response message in response to receiving the random access message (e.g., as described in connection with 1110 and 1210. In some examples, the random access response message includes an uplink grant. In some examples, the base station may generate the random access response message based on the success or failure of the decoding of the payload. For example, if the base station successfully decodes the payload, the base station may generate the random access response message to also include timing advancement information, contention resolution information, and/or radio resource control (RRC) connection setup information. In some examples, if the base station is unable to decode the payload, the base station may generate the random access response message to also include information indicating the failure to decode the payload. The random access message may be the second random access message, and the apparatus may further comprise a decode component 1316 configured to attempt to decode the payload of the second random access message and a provision component 1318 configured to provide, in the random access response message, timing advancement information, contention resolution information, and/or RRC connection setup information, in response to the base station successfully decoding the payload. The apparatus may include a failure component 1320 configured to provide, in the random access response message, information indicating a failure to decode the payload of the second random access message, in response to the base station unsuccessfully decoding the payload. The RACH message component 1310 may be configured to receive, from the UE, a third-type random access message including the payload based at least in part on the information indicating the failure to decode the payload.

The apparatus may include additional components that perform each of the blocks of the algorithm in the aforementioned flowcharts of FIGS. 11 and/or 12. As such, each block in the aforementioned flowcharts of FIGS. 11 and/or 12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 14:
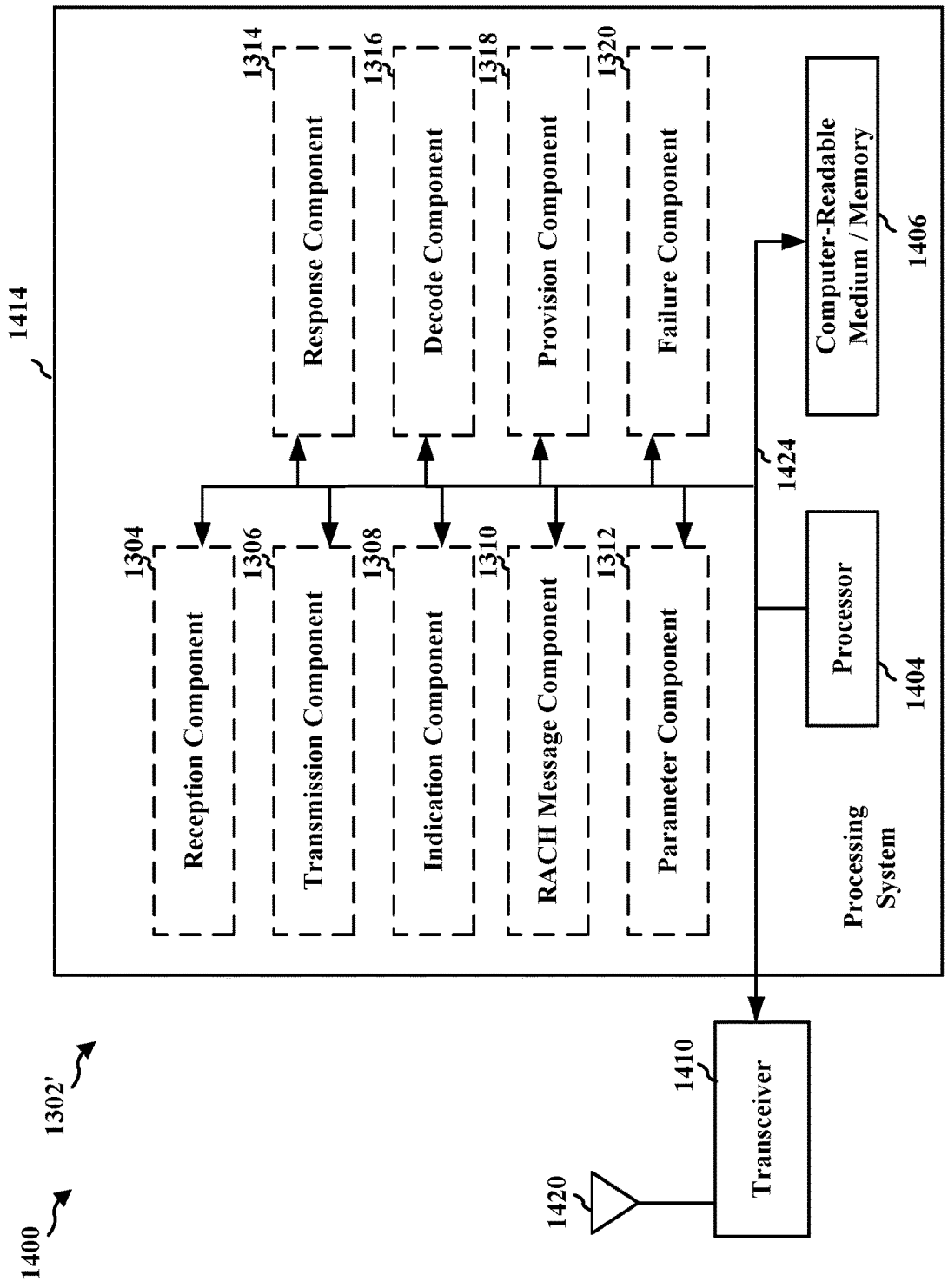
FIG. 14 is a diagram illustrating an example of a hardware implementation for an apparatus employing a processing system.

FIG. 14 is a diagram 1400 illustrating an example of a hardware implementation for an apparatus 1302' employing a processing system 1414. The processing system 1414 may be implemented with a bus architecture, represented generally by the bus 1424. The bus 1424 may include any number of interconnecting buses and bridges depending on the specific application of the processing system 1414 and the overall design constraints. The bus 1424 links together various circuits including one or more processors and/or hardware components, represented by the processor 1404, the components 1304, 1306, 1308, 1310, 1312, 1314, 1316, 1318, 1320, and the computer-readable medium/memory 1406. The bus 1424 may also link various other circuits such as timing sources, peripherals, voltage regulators, and power management circuits, which are well known in the art, and therefore, will not be described any further.

The processing system 1414 may be coupled to a transceiver 1410. The transceiver 1410 is coupled to one or more antennas 1420. The transceiver 1410 provides a means for communicating with various other apparatus over a transmission medium. The transceiver 1410 receives a signal from the one or more antennas 1420, extracts information from the received signal, and provides the extracted information to the processing system 1414, specifically the reception component 1304. In addition, the transceiver 1410 receives information from the processing system 1414, specifically the transmission component 1306, and based on the received information, generates a signal to be applied to the one or more antennas 1420. The processing system 1414 includes a processor 1404 coupled to a computer-readable medium/memory 1406. The processor 1404 is responsible for general processing, including the execution of software stored on the computer-readable medium/memory 1406. The software, when executed by the processor 1404, causes the processing system 1414 to perform the various functions described supra for any particular apparatus. The computer-readable medium/memory 1406 may also be used for storing data that is manipulated by the processor 1404 when executing software. The processing system 1414 further includes at least one of the components 1304, 1306, 1308, 1310, 1312, 1314, 1316, 1318, 1320. The components may be software components running in the processor 1404, resident/stored in the computer readable medium/memory 1406, one or more hardware components coupled to the processor 1404, or some combination thereof. The processing system 1414 may be a component of the base station 310 and may include the memory 376 and/or at least one of the TX processor 316, the RX processor 370, and the controller/processor 375. Alternatively, the processing system 1414 may be the entire base station (e.g., see 310 of FIG. 3).

In one configuration, the apparatus 1302/1302' for wireless communication includes means for providing, to a User Equipment (UE), an indication that configures a fallback timer associated with a two-step random access procedure. The apparatus 1302/1302' may also include means for receiving, from the UE, a random access message based at least in part on the indication, where the random access message is one of either a first-type random access message associated with a four-step random access procedure and including a preamble or a second-type random access message associated with the two-step random access procedure and including the preamble and a payload. The apparatus 1302/1302' may also include means for attempting to decode the payload of the second-type random access message when the received random access message is the second-type random access message. The apparatus 1302/1302' may also include means for providing, in a random access response message, an uplink grant and at least one of timing advancement information, contention resolution information, or RRC connection setup information in response to successfully decoding the payload. The apparatus 1302/1302' may also include means for providing, in the random access response message, the uplink grant and information indicating a failure to decode the payload of the second-type random access message in response to unsuccessfully decoding the payload. The apparatus 1302/1302' may also include means for receiving, from the UE, a third-type random access message associated with the four-step random access procedure and including the payload based at least in part on the information indicating the failure to decode the payload.

In an additional or alternative configuration, the apparatus 1302/1302' for wireless communication includes means for providing to a User Equipment (UE), an indication of whether the base station supports a two-step random access procedure. The apparatus 1302/1302' may also include means for receiving, from the UE, a random access message based at least in part on the indication, where the random access message is one of either a first-type random access message associated with a four-step random access procedure and including a preamble or a second-type random access message associated with the two-step random access procedure and including the preamble and a payload. The apparatus 1302/1302' may also include means for transmitting, to the UE, at least one parameter including one or more of a payload size, a Reference Signal Received Power (RSRP) threshold, a path loss threshold, a fallback timer setting, a first-type random access message transmittal count threshold, or a second-type random access message transmittal count threshold. The apparatus 1302/1302' may also include means for generating a random access response message in response to receiving the random access message, the random access response message including at least an uplink grant. The apparatus 1302/1302' may also include means for transmitting, to the UE, the random access response message. The apparatus 1302/1302' may also include means for attempting to decode the payload of the second-type random access message when the received random access message is the second-type random access message. The apparatus 1302/1302' may also include means for providing, in the random access response message, timing advancement information, contention resolution information, or RRC connection setup information in response to the base station successfully decoding the payload. The apparatus 1302/1302' may also include means for providing, in the random access response message, information indicating a failure to decode the payload of the second-type random access message in response to the base station unsuccessfully decoding the payload. The apparatus 1302/1302' may also include means for receiving, from the UE, a third-type random access message associated with the four-step random access procedure and including the payload based at least in part on the information indicating the failure to decode the payload.

The aforementioned means may be one or more of the aforementioned components of the apparatus 1302 and/or the processing system 1414 of the apparatus 1302' configured to perform the functions recited by the aforementioned means. As described supra, the processing system 1414 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a User Equipment (UE), comprising:
   transmitting, to a base station, a second-type random access message associated with a two-step random access procedure and including a preamble and a payload;
   incrementing a second-type random access message transmittal count after the transmitting of the second-type random access message;
   receiving a random access response message that indicates a failure to decode at least a portion of the second-type random access message; and
   determining whether to repeat transmission of the second-type random access message or to generate a first-type random access message associated with a four-step random access procedure based on reception of the random access response message and whether the second-type random access message transmittal count satisfies a second-type random access message transmittal count threshold.

2. The method of claim 1, further comprising:
   receiving, from the base station, at least one parameter associated with the two-step random access procedure, the at least one parameter including one or more of a payload size, a set of payload sizes, a Reference Signal Received Power (RSRP) threshold, a path loss threshold, a fallback timer setting, a first-type random access message transmittal count threshold, or the second-type random access message transmittal count threshold, and
   wherein transmitting the second-type random access message is based on the at least one parameter.

3. The method of claim 2, wherein the at least one parameter is received via system information.

4. The method of claim 2, wherein the at least one parameter is received via dedicated signaling while the UE is operating in a connected mode.

5. The method of claim 2, further comprising:
   measuring a reference signal;
   comparing a measurement of the reference signal to the at least one parameter; and determining to transmit the second-type random access message when the measurement of the reference signal satisfies a threshold associated with the at least one parameter.

6. The method of claim 5, wherein the reference signal is comprised in a Synchronization Signal Block (SSB).

7. The method of claim 5, wherein the reference signal comprises a channel state information reference signal.

8. The method of claim 5, further comprising:
selecting the reference signal to measure based on a predetermined rule.

9. The method of claim 5, further comprising:
selecting the reference signal to measure from among a plurality of reference signals received by the UE and based on respective reference signal measurements.

10. The method of claim 5, wherein the measurement of the reference signal comprises a Reference Signal Received Power (RSRP) of the reference signal, wherein the UE transmits the second-type random access message based on the RSRP of the reference signal being greater than or equal to the RSRP threshold.

11. The method of claim 5, wherein the measurement of the reference signal comprises a path loss measurement associated with the reference signal, and wherein the UE transmits the second-type random access message based on the path loss measurement being less than or equal to the path loss threshold.

12. The method of claim 2, further comprising:
measuring at least one reference signal;
comparing a measurement of the at least one reference signal to the at least one parameter; and
determining to generate the first-type random access message when the measurement of the at least one reference signal does not satisfy a threshold associated with the at least one parameter.

13. The method of claim 1, further comprising receiving, from the base station, an indication that indicates whether the base station supports the two-step random access procedure, wherein a fallback timer is configured when the base station supports the two-step random access procedure.

14. The method of claim 13, wherein the indication indicates that the base station supports the two-step random access procedure on an access class basis, and wherein transmitting the second-type random access message is based on an access class associated with the UE.

15. The method of claim 1, wherein determining whether to repeat the transmission of the second-type random access message or to perform the four-step random access procedure is further based on whether a fallback timer is active for the UE.

16. The method of claim 1, wherein if the second-type random access message transmittal count does not satisfy the second-type random access message transmittal count threshold, the method further comprises:
generating the first-type random access message.

17. The method of claim 1, wherein if the second-type random access message transmittal count is less than the second-type random access message transmittal count threshold, the method further comprises:
repeating the transmission of the second-type random access message while a fallback timer is active.

18. The method of claim 1,
wherein the random access response message includes an uplink grant and information indicating the failure to decode the payload of the second-type random access message; and transmitting, to the base station, a third-type random access message comprising the payload based on the uplink grant, the third-type random access message associated with the four-step random access procedure.

19. The method of claim 18, further comprising determining whether to perform another random access attempt using the two-step random access procedure or the four-step random access procedure when a fallback timer is active and no response to the third-type random access message is received or when the fallback timer is active and the UE receives a response to the third-type random access message indicating another failure to decode the payload.

20. The method of claim 1, wherein the random access response message includes an uplink grant and an identifier associated with the UE.

21. The method of claim 1, wherein the UE uses a radio network temporary identifier (RNTI) to receive a response message associated with the two-step random access procedure or the four-step random access procedure.

22. The method of claim 1, wherein the UE uses, while operating in an idle mode or an inactive mode, a random access radio network temporary identifier (RA-RNTI) to receive a response message associated with the two-step random access procedure or the four-step random access procedure.

23. The method of claim 1, wherein the UE uses a cell radio network temporary identifier (C-RNTI) to receive a response message associated with the two-step random access procedure while the UE is operating in a connected mode.

24. The method of claim 1, further comprising:
receiving a configuration of a fallback timer associated with the second-type random access message, wherein the fallback timer is a timer or a counter.

25. An apparatus for wireless communication at a user equipment (UE), comprising:
a memory; and
at least one processor coupled to the memory and configured to:
transmit, to a base station, a second-type random access message associated with a two-step random access procedure and including a preamble and a payload;
increment a second-type random access message transmittal count after a transmission of the second-type random access message;
receive a random access response message that indicates a failure to decode at least a portion of the second-type random access message; and
determine whether to repeat the transmission of the second-type random access message or to generate a first-type random access message associated with a four-step random access procedure based on reception of the random access response message and whether the second-type random access message transmittal count satisfies a second-type random access message transmittal count threshold.

26. A method of wireless communication at a base station, comprising:
providing, to a User Equipment (UE), an indication that configures a transmittal count threshold associated with a two-step random access procedure; and
receiving, from the UE, a second-type random access message including a preamble and a payload;
transmitting a random access response message that indicates a failure to decode at least a portion of the second-type random access message; and receiving a repeat transmission of the second-type random access message or a first-type random access message associated with a four-step random access procedure based on the random access response message and the transmittal count threshold.

27. The method of claim 26, further comprising:
attempting to decode the payload of the second-type random access message; and
providing, in the random access response message, an uplink grant and at least one of timing advancement information, contention resolution information, or RRC connection setup information in response to successfully decoding the payload.

28. The method of claim 27, further comprising:
providing, in the random access response message, the uplink grant and information indicating the failure to decode the payload of the second-type random access message in response to unsuccessfully decoding the payload; and
receiving, from the UE, a third-type random access message associated with the four-step random access procedure and including the payload based at least in part on the information indicating the failure to decode the payload.

29. An apparatus for wireless communication at a base station, comprising:
a memory; and
at least one processor coupled to the memory and configured to:
provide, to a User Equipment (UE), an indication that configures a transmittal count threshold associated with a two-step random access procedure; and
receive, from the UE, a second-type random access message including a preamble and a payload;
transmit a random access response message that indicates a failure to decode at least a portion of the second-type random access message; and
receive a repeat transmission of the second-type random access message or a first-type random access message associated with a four-step random access procedure based on the random access response message and the transmittal count threshold.

* * * * *